(12) United States Patent
Yu et al.

(10) Patent No.: US 11,761,225 B2
(45) Date of Patent: Sep. 19, 2023

(54) MECHANISM FOR DETECTING OBSTACLES AND MECHANICALLY REVERSING A DIRECTION OF A POOL CLEANER

(71) Applicant: WYBOTICS Co., LTD., Tianjin (CN)

(72) Inventors: Qian Yu, Tianjin (CN); Pu Cen, Tianjin (CN); Jiancheng Huang, Tianjin (CN); Liangliang Xu, Tianjin (CN)

(73) Assignee: WYBOTICS CO., LTD., Tianjin (CN)

( * ) Notice: Subject to any disclaimer, the term of this patent is extended or adjusted under 35 U.S.C. 154(b) by 229 days.

(21) Appl. No.: 17/269,542

(22) PCT Filed: Feb. 21, 2020

(86) PCT No.: PCT/CN2020/076270
§ 371 (c)(1),
(2) Date: Feb. 19, 2021

(87) PCT Pub. No.: WO2020/224308
PCT Pub. Date: Nov. 12, 2020

(65) Prior Publication Data
US 2021/0238876 A1    Aug. 5, 2021

(30) Foreign Application Priority Data
May 5, 2019   (CN) .......................... 201910368697.0

(51) Int. Cl.
*E04H 4/16* (2006.01)
*B01D 33/80* (2006.01)
(Continued)

(52) U.S. Cl.
CPC ......... *E04H 4/1654* (2013.01); *B01D 33/801* (2013.01); *B01D 33/803* (2013.01);
(Continued)

(58) Field of Classification Search
CPC .. E04H 4/1654; B01D 33/801; B01D 33/803; B01D 2201/26; G01V 9/00; G05D 1/0206
(Continued)

(56) References Cited

U.S. PATENT DOCUMENTS

2012/0210527 A1*  8/2012  Erlich ................... E04H 4/1654
                                                                          15/1.7

FOREIGN PATENT DOCUMENTS

| CN | 107923191 A | 4/2018 |
| FR | 2896005 A1 | 7/2007 |

(Continued)

OTHER PUBLICATIONS

Machine-generated English translation of KR 2003-0046325, generated on Jan. 17, 2023.*
(Continued)

*Primary Examiner* — Fred Prince
(74) *Attorney, Agent, or Firm* — Bayramoglu Law Offices LLC

(57) ABSTRACT

A mechanism for detecting obstacles and mechanically reversing (a direction of) a pool cleaner includes a drive part in non-rotatable connection with a cleaner housing, an arresting assembly connected to the cleaner housing, and a rotary direction-changing assembly rotatably connected to the cleaner housing or the drive part. The arresting assembly cooperates with the rotary direction-changing assembly. The mechanism for detecting obstacles and mechanically reversing (a direction of) a pool cleaner is compact in structure, low in manufacturing cost, and can perform obstacle detection and change a direction of the pool cleaner. With the structure of the rotary direction-changing assembly capable of rotating relative to the cleaner housing, the cleaner, when meeting an obstacle, is allowed to change the traveling direction, thereby resulting in a high working efficiency.

20 Claims, 15 Drawing Sheets

(51) Int. Cl.
    *G01V 9/00*     (2006.01)
    *G05D 1/02*     (2020.01)

(52) U.S. Cl.
    CPC ............. *G01V 9/00* (2013.01); *G05D 1/0206* (2013.01); *B01D 2201/26* (2013.01)

(58) Field of Classification Search
    USPC ................... 210/143, 167.16, 167.17; 15/1.7
    See application file for complete search history.

(56) References Cited

FOREIGN PATENT DOCUMENTS

KR     2003-0046325 A  *  6/2003
WO    WO 2012/108903 A1  *  8/2012

OTHER PUBLICATIONS

Machine-generated English translation of CN 107923191, generated on Jan. 17, 2023.*

* cited by examiner

MECHANISM FOR DETECTING OBSTACLES AND MECHANICALLY REVERSING A DIRECTION OF A POOL CLEANER

CROSS REFERENCE TO THE RELATED APPLICATIONS

This application is the national phase entry of International Application No. PCT/CN2020/076270, filed on Feb. 21, 2020, which is based upon and claims priority to Chinese Patent Application No. 201910368697.0, filed on May 5, 2019, the entire contents of which are incorporated herein by reference.

TECHNICAL FIELD

The present invention belongs to the technical field of cleaning equipment, and in particular, relates to a mechanism for detecting obstacles and mechanically reversing (a direction of) a pool cleaner.

BACKGROUND

With sustained economic and social development and the continuous improvement of living standards, swimming pools for leisure and fitness have become increasingly popular. Swimming pools typically extend below the ground surface. Some pools may be heated swimming pools depending on water temperature. In foreign countries, swimming pools are often private, unavailable to the public. In China, however, public swimming pools are more common. Whether private or public, heated or not, above ground or in-ground, significant amounts of debris and rubbish are likely to be produced during use. Most all swimming pools, therefore, require regular cleaning. Automatic swimming pool cleaners have become quite popular. Directional control or turning of automatic cleaners is generally controlled according to time. The pool cleaner is unable to detect a wall or obstacle and, therefore, cannot return or turn away accordingly. When the cleaner meets a wall or other obstacles, the cleaner must wait and cannot return until the end of a set time period, which is inefficient. In alternative designs, the cleaner may include an electronic element that detects contact with a wall or other obstacle, but these designs add complexity and cost to the cleaner. Other cleaners may utilize a swivel structure to change direction by rotation. In this case, components such as a motor and power source must be mounted inside the swivel and cannot be connected to an external source by using a power cable because the power cable may be twisted along with the rotation of the swivel, thus eventually preventing movement of the cleaner.

SUMMARY

In view of the above issues, the problem to be solved by the present invention is to provide a mechanism for detecting obstacles and mechanically reversing (a direction of) a pool cleaner. Such a mechanism is particularly suitable for use in a swimming pool cleaner and is capable of detecting the obstacle and change the direction of the cleaner. The new mechanism has compact structure, is convenient to use and functions efficiently.

To solve the above technical problem, the technical solution adopted in the present invention is as follows: a mechanism for detecting obstacles and mechanically reversing (a direction of) a pool cleaner includes a drive part in non-rotatable connection with a cleaner housing, an arresting assembly connected to the cleaner housing, and a rotary direction-changing assembly rotatably connected to the cleaner housing or the drive part, wherein the arresting assembly cooperates with the rotary direction-changing assembly.

The drive part includes a driving unit and a suction assembly. The driving unit and the suction assembly are connected. The driving unit is in non-rotatable connection with the cleaner housing, and the rotary direction-changing assembly is coupled or in soft contact with the suction assembly.

In another aspect of the invention, the rotary direction-changing assembly includes a rotating assembly rotatably connected to the cleaner housing or the drive part, and a direction-changing assembly connected to the rotating assembly.

Further, the rotating assembly includes a rotating section and a turning section, the rotating section and the turning section are connected, and the turning section is rotatably connected to the cleaner housing or the drive part.

In another aspect, the suction assembly is hydraulically coupled with the rotating assembly.

In yet another aspect, suction assembly is magnetically coupled with the rotating assembly.

Further, the rotating section is provided with a water channel and a water outlet, the water channel and the water outlet are communicated with each other, and the suction assembly cooperates with the water channel.

Further, at least one resistance plate is arranged on the direction-changing assembly, an arresting portion is arranged on the resistance plate, and the arresting portion cooperates with the arresting assembly.

Still further, at least one direction-changing assembly is present.

Further, at least one arresting assembly is present.

The present invention has the following advantages and beneficial effects:

1. The use of the above technical scheme results in a compact structure and a decrease in the manufacturing cost of the mechanism for detecting obstacles and mechanically reversing (a direction of) a pool cleaner. The mechanism achieves obstacle detection and direction changing of the cleaner. The rotary direction-changing assembly is capable of rotating relative to the cleaner housing, allowing the cleaner to travel in a different direction when meeting the wall and resulting in increased working efficiency.

2. As a cleaner with a sealing device, the sealing device is fixedly connected to the cleaner housing. When an external power source is used to supply power, the driving unit mounted in the sealing device is electrically connected to the external power source by a power cable. The power cable does not rotate along with the rotary direction-changing assembly and thus may not be entangled with the cleaner so that the directional changes of cleaner go unfettered by the cord. Additionally, the power cable is not twisted, which makes the new cleaner more efficient and convenient and adds to the life of the cord.

3. The rotating assembly is coupled with the suction assembly. Based on the principle of hydraulic coupling, the change in moment of momentum due to the interaction of a liquid, the suction assembly and the rotating assembly results in the transfer of torque of the suction assembly, allowing the rotating assembly and the suction assembly to rotate in the same direction and thus achieving traveling and direction changing of the cleaner. This design simplifies the structure, stabilizes operation and makes mounting of the cleaner convenient during manufacture.

4. The rotating assembly is coupled with the suction assembly by a coupling piece. Based on the principle of magnetic coupling, the transfer of torque of the suction assembly can be achieved based on the interaction of repelling or attraction between magnets or attraction between a magnet and a ferromagnetic material such as iron, nickel and cobalt, allowing the rotating assembly and the suction assembly to rotate in the same direction and thus accomplish movement and directional changing of the cleaner. This design simplifies the structure, stabilizes operation and makes mounting of the cleaner convenient during manufacture.

5. The rotating assembly and the direction-changing assembly are present. The rotating assembly is capable of rotating relative to the cleaner housing, thereby driving the direction-changing assembly to rotate. The direction-changing assembly cooperates with the arresting assembly to control the rotation of the rotating assembly, thereby controlling the traveling direction of the cleaner and effecting directional change of the pool cleaner. With the rotating assembly, convenient direction changing of the cleaner when meeting a wall can be realized. Moreover, this design simplifies the structure, stabilizes operation and makes mounting of the cleaner convenient during manufacture.

Figure 1:
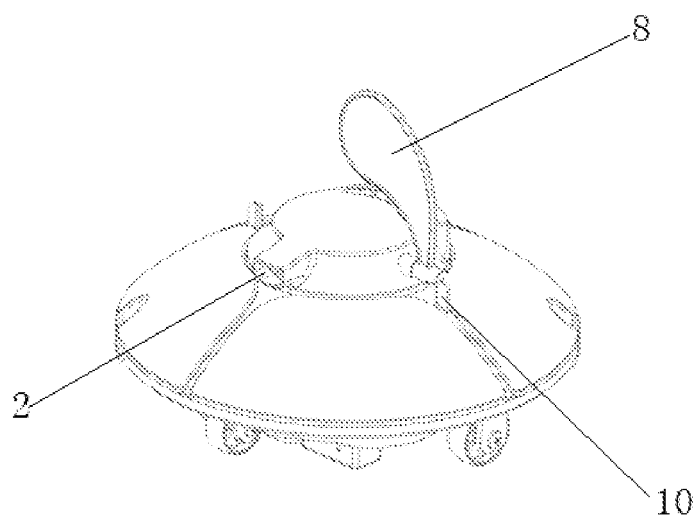
FIG. 1 is a top schematic structural diagram of an embodiment of the invention according to example 1.
Figure 2:
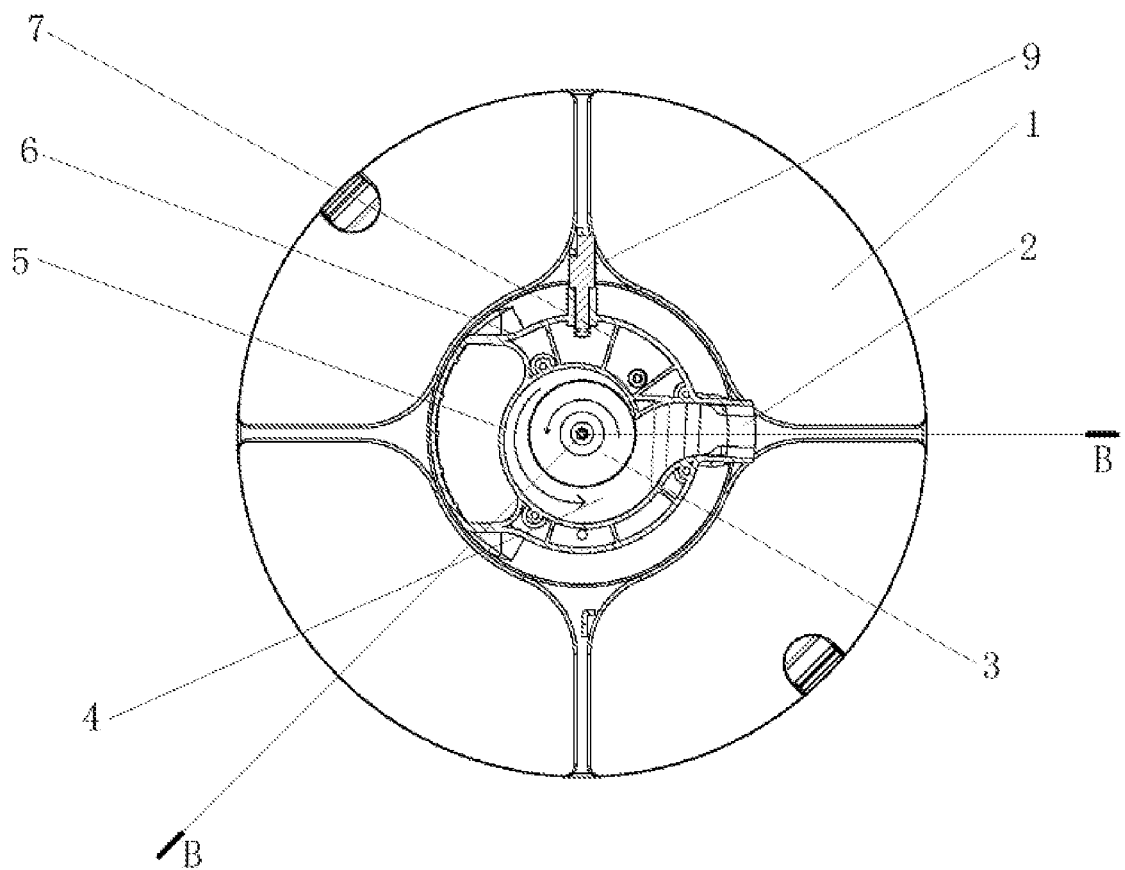
FIG. 2 is a top partial sectional plane view of the embodiment of FIG. 1.
Figure 3:
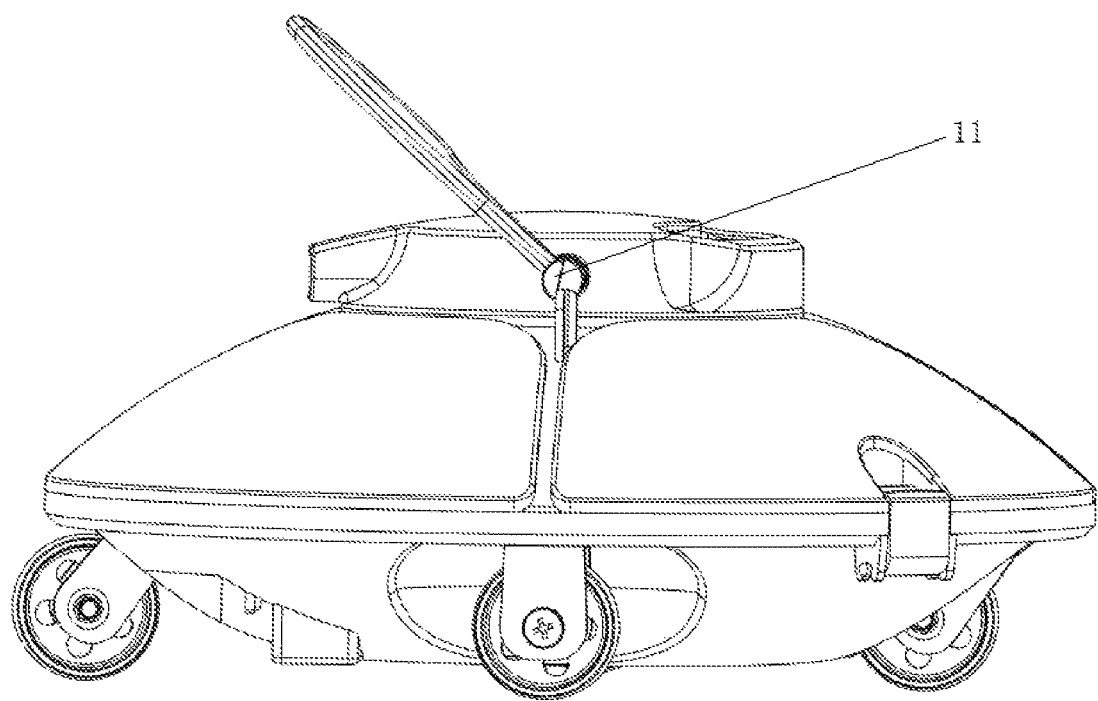
FIG. 3 is a side schematic diagram of a cleaner in motion according to an example of the present invention.
Figure 4:
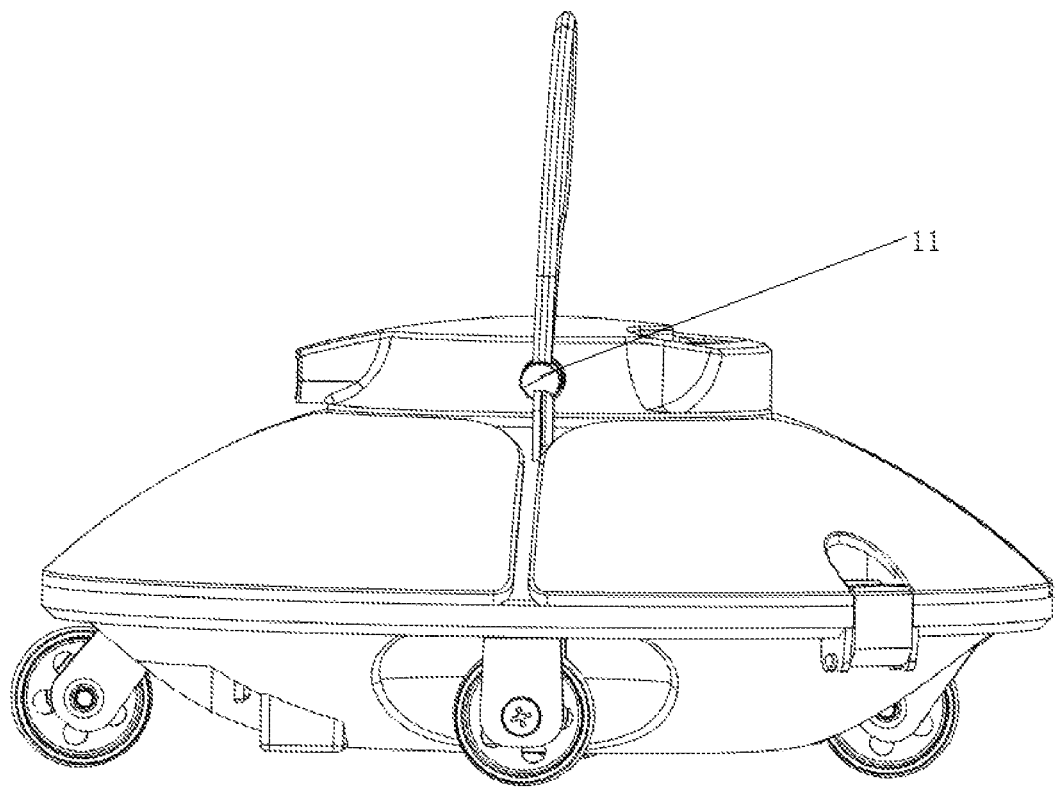
FIG. 4 is another side schematic diagram showing a reset state of a resistance plate when a cleaner meets a wall according to an example of the present invention.

1 - Cleaner housing;
2 - Water outlet;
3 - Suction assembly;
4 - Water channel;
5 - Inner casing structure;
6 - Outer casing structure;
7 - Resistance piece;
8 - Resistance plate;
9 - Rotating piece;
10 - Arresting assembly;
11 - arresting portion;
12 - Turning section;
13 - Driving unit;
14 - Support part
15 - Sealing device
12' - Turning section;
15' - Sealing part;
16 - Power cable;
17 - First baffle;
18 - Bottom plate;
120 - Rolling piece;
121 - Rolling supporting piece;
122 - Supporting piece;
50 - Open end of inner casing structure;
60 - Open end of outer casing structure;
180 - Through hole;
123 - mounting hole;
124 - mounting hole;
125 - Sliding groove;
126 - Sliding groove;
19 - Filter;
20 - Water inlet cover plate
21 - Water inlet;
22 - Upper rotating plate;
23 - Lowerrotating plate;
24 - Upper open end of cleaner housing;
25 - Coupling surface;
26 - Kinetic energy transfer piece;
27 - First coupling piece
28 - Second coupling piece;
29 - Roller;
30 - Column;
31 - Stop piece;
32 - Track;
33 - Inclined face;
34 - Side face;
35 - Soft contact component

DETAILED DESCRIPTION OF THE EMBODIMENTS

The present invention will be described in more detail below in conjunction with the accompanying drawings and specific examples.

FIG. 1 to FIG. 22 are schematic structure diagrams of three examples of the present invention, specifically illustrating structures of the three examples that relate to a mechanism for detecting obstacles and mechanically reversing (a direction of) a pool cleaner. The mechanism for detecting obstacles and mechanically reversing (a direction of) a pool cleaner is mounted on a cleaner to facilitate obstacle detection and direction changing of the cleaner. The novel mechanism has a rotatable pump casing, which cooperates with an impeller of a suction assembly to transfer the torque of the impeller based on the theory of coupling, thereby allowing the rotatable pump casing and the impeller to rotate in the same direction. The cleaner is actuated to travel by reverse thrust of water drained from a water outlet of the rotatable pump casing. When the cleaner contacts a wall, the pump casing is capable of rotating to change direction under the action of a direction-changing assembly. The mechanism is simple in structure and allows for flexible motion, so that the cleaner can automatically complete cleaning of every area of a swimming pool with improved efficiency and decreased work intensity.

Example 1

The mechanism for detecting obstacles and mechanically reversing (a direction of) a pool cleaner includes a drive part in non-rotatable connection with a cleaner housing, the arresting assembly 10 connected to the cleaner housing 1, and a rotary direction-changing assembly rotatably connected to the cleaner housing 1 or the drive part. The arresting assembly 10 cooperates with the rotary direction-changing assembly. The drive part functions to actuate and power the rotary direction-changing assembly to operate. Thus, the rotary direction-changing assembly is allowed to rotate in the same direction with a suction assembly, and allowed to coordinate with the arresting assembly 10. In addition, with the coordination of the arresting assembly 10 and the rotary direction-changing assembly, directional change of the cleaner is achieved when the cleaner meets a wall. The drive part functions to draw water from the bottom into the cleaner housing 1 through the water inlet 21 of the cleaner. The water is filtered by the filter 19 and then drained through the water outlet 2 of the rotary direction-changing assembly to apply thrust to the cleaner, thereby actuating the cleaner to travel. When the cleaner travels, the rotary direction-changing assembly cooperates with the arresting assembly 10, and remains stationary relative to the cleaner housing. The cleaner continues traveling, and when the cleaner meets a wall, the rotary direction-changing assembly is disengaged from the arresting assembly 10 for direction changing and then the cleaner continues travelling. The rotary direction-changing assembly is then coordinated with the arresting assembly 10 again. This process is repeated until every area of the swimming pool is cleaned.

Specifically, as shown in FIGS. 1-8, the mechanism is mounted on a main body of the cleaner and includes a drive part in non-rotatable connection with a cleaner housing. The drive part supplies power for the cleaner to pump water and travel. The drive part can be connected to the cleaner housing fixedly, or flexibly, or in other non-rotatable connection manners, as known in practice. Preferably, in this example, the drive part is fixedly connected to the cleaner housing 1. The drive part includes the sealing device 15, the driving unit 13 and the suction assembly 3. The sealing device 15 is fixedly connected to the cleaner housing 1. The driving unit 13 is fixedly mounted within the sealing device 15. The suction assembly 3 and the driving unit 13 are connected and arranged coaxially. The driving unit 13 supplies power for the suction assembly 3, allowing the suction assembly 3 to rotate under the action of the driving unit 13. The suction assembly 3 cooperates with the rotary direction-changing assembly, so that the rotary direction-changing assembly can be actuated to move by the motion of the suction assembly 3. The interaction between the suction assembly 3 and the rotary direction-changing assembly is achieved by coupling, which is hydraulic coupling in the present example. The change in moment of momentum due to the interaction between a liquid and the suction assembly 3 and the rotary direction-changing assembly results in the transfer of torque of the suction assembly 3. When the suction assembly 3 rotates, the liquid is pushed to flow, causing the rotary direction-changing assembly to rotate in the same direction with the suction assembly 3 under the action of the torque transferred by the liquid. The suction assembly 3 is powered by the driving unit 13 to function to pump water into the cleaner housing 1. The water is filtered by the filter 19, and then the filtered water is drained through the water outlet 2 of the rotary direction-changing assembly, thereby propelling the cleaner to travel.

The above sealing device 15 is fixedly mounted on the cleaner housing 1. The sealing device 15 can be fixedly mounted inside the cleaner housing 1, or fixedly mounted outside the cleaner housing 1 and fixedly connected to an outer wall of the cleaner housing 1. Alternatively, the sealing device 15 is fixedly mounted inside the cleaner housing 1, and an upper portion of the sealing device 15 protrudes from the top of the cleaner housing 1. Alternatively, other fixedly mounting manners can be adopted. All such manners can be selected as required in practice, which are not specified here. The arrangement of the sealing device 15 is conducive to the mounting of the driving unit 13. The driving unit 13 is hermetically secured inside the sealing device 15 and protected from damage such as short circuit due to contact with water. Alternatively, without the sealing device 15, the driving unit 13 is connected to the cleaner housing 1 by a flexible shaft or a hose, and further connected to the suction assembly 3. The driving unit 13 is located outside the cleaner, floated on the surface of the water or operably mounted as such poolside using known means, which can be selected as required in practice and will not be specified here. Preferably, in this example, the sealing device 15 is fixedly mounted inside the cleaner housing 1.

The sealing device 15 is a hermetic container structure in which a holding cavity is formed. The driving unit 13 is hermetically mounted inside the sealing device 15, so that water is prevented from contact with the driving unit 13 to cause damage such as short circuit of the driving unit 13. The driving unit 13 is fixedly mounted inside the sealing device 15 by a connecting member such as a screw, and a drive shaft of the driving unit 13 protrudes from the sealing device 15 and is connected to the suction assembly 3 for supplying power to the suction assembly 3. A sealing piece is mounted at the joint of the drive shaft of the driving unit 13 and the sealing device 15 to seal the protruding drive shaft, thereby preventing water from intruding into the sealing device 15 to cause damage of the driving unit 13.

Preferably, here, the driving unit 13 is a motor, which is a commercially available product and can be selected as required in practice.

The suction assembly 3 is fixedly mounted at the free end of the drive shaft of the driving unit 13. The suction assembly 3 serves to pump the water into the cleaner when it is cleaning, and the water is filtered by the filter 19. The suction assembly 3 is an impeller, preferably a centrifugal impeller, which can be selected as required in practice. The centrifugal impeller is actuated by the driving unit 13 to rotate, and the generated suction causes the water to be drawn into the cleaner housing 1. The water is drained through the water outlet 2 of the rotary direction-changing assembly after being filtered by the filter 19. The rotation of the centrifugal impeller drives the water entering the rotary direction-changing assembly to rotate. The water is used as a transfer medium for the torque of the suction assembly 3. The change in moment of momentum due to the interaction between water and the centrifugal impeller and the rotary direction-changing assembly, results in the transfer of torque of the centrifugal impeller, which allows the rotary direction-changing assembly to rotate in the same direction with the centrifugal impeller and realizes travel and direction changing of the cleaner.

The above rotary direction-changing assembly includes a rotating assembly connected to the cleaner housing 1 or the driving unit 13 or the suction assembly 3, and a direction-changing assembly connected to the rotating assembly. With changing of rotating and stop states of the rotating assembly or moving and stop states of the cleaner, the direction-changing assembly is actuated to rotate, so that the direction-changing assembly comes in contact with and is disengaged from the arresting assembly 10, thus resulting in direction changing of the cleaner.

Figure 5:
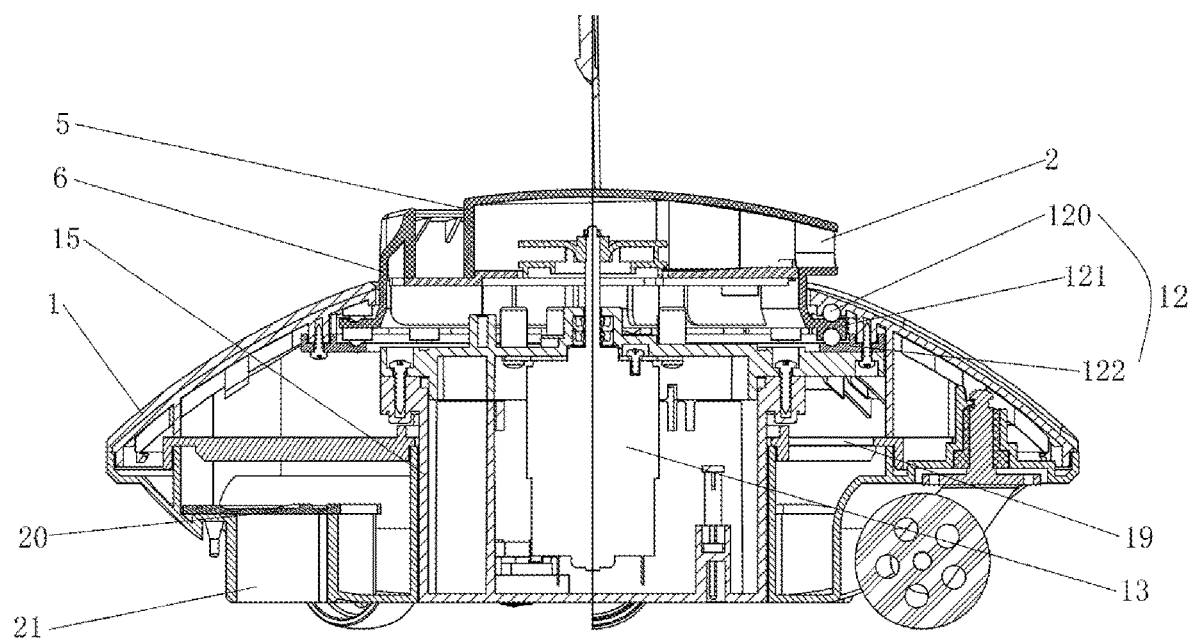
FIG. 5 is a sectional view taken along lines B-B of FIG. 2.
Figure 6:
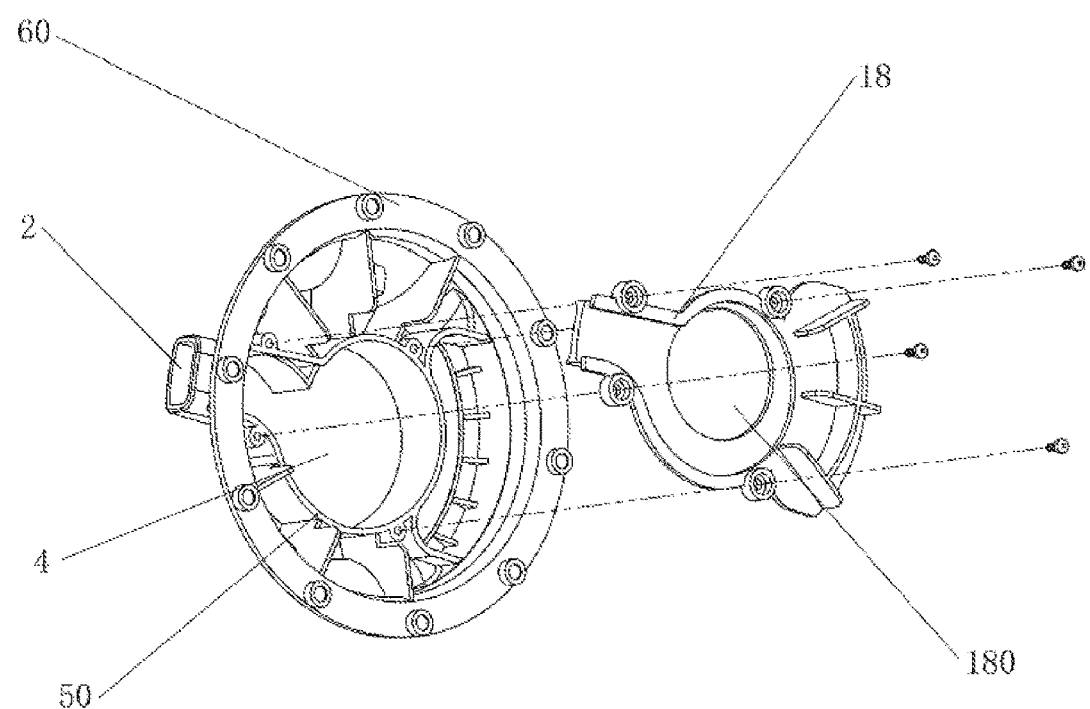
FIG. 6 is an exploded schematic structure diagram of a rotating assembly according to an example of the present invention.

More specifically, as shown in FIG. 5, the rotating assembly includes a rotating section and the turning section 12. The rotating section is fixedly connected to the turning section 12. The rotating section is provided with the water channel 4 and the water outlet 2. After the water in the rotating section flows into the water channel 4, the rotating section is driven to rotate under the action of a coupling force transmitted by the suction assembly 3 and the water. The rotating section is a casing structure with a space inside. One end of the casing structure of the rotating section is open, so that the rotating section cooperates with the suction assembly 3 during installation. The water outlet 2 is formed at the other end of the casing structure of the rotating section, so that the filtered water is drained therethrough. In addition, the drained water applies thrust to the cleaner causing it to travel. The turning section 12 is fixedly mounted at the open end of the rotating section. Besides, the turning section 12 is adapted to the shape of the open end of the rotating section and fixedly mounted along the circumference of the open end of the rotating section. An included angle between a water draining direction of the water outlet 2 and the horizontal plane is less than 90 degrees, facilitating the application of thrust to the cleaner.

As shown in FIGS. 2-8, the rotating section includes the inner casing structure 5 coordinated with the suction assembly and having the water channel 4 and the water outlet 2. The inner casing structure 5 is a volute structure. The inner space of the volute structure is the water channel 4 for water to flow therethrough. The suction assembly 3 is arranged in the water channel 4. The inner casing structure 5 has a certain casing height, the minimum value of which is adapted to the height of the suction assembly 3, so that the suction assembly 3 is mounted inside the inner casing structure 5. Preferably, the casing height of the inner casing structure 5 is greater than the height of the suction assembly 3, so that water flows through the water channel 4 and is drained through the water outlet 2. When the centrifugal impeller of the suction assembly 3 rotates, the water is driven to swirl. When the water flows through the water channel 4, the torque of the suction assembly 3 is transferred, driving the inner casing structure 5 to rotate. The rotation of the inner casing structure 5 results in direction changing of the water drained out of the water outlet 2, thereby causing the cleaner to travel in a different direction. Preferably, axes of the inner casing structure 5 and the suction assembly 3 coincide, so that the inner casing structure 5 and the suction assembly 3 rotate coaxially, thereby reducing power transfer loss.

As a further optimized solution, the outer casing structure 6 is fixedly mounted outside the inner casing structure 5. The outer casing structure 6 is arranged to surround the outside of the casing structure 5, i.e., the inner casing structure 5 is located inside the outer casing structure 6. The outer casing structure 6 is connected to the closed end of the inner casing structure 5, and the connected end of the outer casing structure 6 is also closed. The inner wall of the outer casing structure 6 and the outer wall of the inner casing structure 5 define a holding cavity. The outer casing structure 6 is provided with an opening on the same side with the open end 50 of the inner casing structure, thereby forming the open end 60 of the outer casing structure. That is, this end of the outer casing structure 6 is open, facilitating inflow of water. The inner casing structure 5 and the outer casing structure 6 can be integrally formed, or connected by a connecting piece such as a bolt, or fixedly connected in other manners, which can be selected as required in practice and will not be specified here. Preferably, the inner casing structure 5 is integrally formed with the outer casing structure 6 here, and such a structure is stable and not prone to deformation and damage.

A plurality of resistance pieces 7 are arranged on the inner wall of the outer casing structure 6. When the cleaner is in use, water flows into the inner casing structure 5 via the open end 60 of the outer casing structure under the action of the suction assembly 3, and with the rotation of the suction assembly 3, the transfer of torque is achieved by means of the change in moment of momentum due to the interaction of the suction assembly 3, the water and the inner casing structure 5, allowing the inner casing structure 5 to rotate in the same direction. The water is then drained through the water outlet 2 of the inner casing structure 5, so that the rotating section rotates under the action of the water channel 4 within the inner casing structure 5. Meanwhile, the space between the inner casing structure 5 and the outer casing structure 6 is full of water to provide resistance to the inner casing structure 5 in rotation, thereby reducing the rotating speed of the inner casing structure 5 and further reducing the rotating speed of the rotating section. With the resistance pieces 7, the strength of the outer casing structure 6 and the inner casing structure 5 can be enhanced and deformations thereof can be reduced. Moreover, improved resistance is provided to reduce the rotating speed of the inner casing structure 5, facilitating direction changing of the direction-changing assembly. The resistance piece 7 may be a blade, or a reinforcing rib, or other structure. The resistance piece 7 is preferably a blade. Whether the resistance piece 7 is provided and the number and size of blades when resistance pieces 7 are provided depend on a desired rotating speed of the rotating section.

Alternatively, without the outer casing structure 6 outside the inner casing structure 5, the resistance pieces 7 can be fixedly mounted on the outer wall of the inner casing structure 5 directly, which can produce the above speed reduction effect as well. Whether the outer casing structure 6 is provided can be determined as required in practice. In this example, the outer casing structure 6 is provided, providing a perfect aesthetic appearance of the rotating section, and the inner casing structure 5 is thus protected, reducing damage to the inner casing structure 5. Moreover, the resistance pieces 7 arranged on the outer wall of the inner casing structure 5 can be prevented from hurting a user.

Conversely, when the rotating assembly rotates too slow or even cannot rotate due to insufficient coupling force between the suction assembly 3 and the rotating assembly, the coupling force can be increased by providing a kinetic energy transfer structure or assembly in cooperation with the suction assembly and/or the rotating assembly, so that an ideal rotating speed of the rotating assembly is achieved. In addition, the rotary direction-changing assembly is in soft contact with the suction assembly. Torque increase and rotation of the rotating assembly at an ideal rotating speed can also be achieved by arranging a low friction or low thrust soft contact component 35 between the suction assembly 3 and the rotating assembly, such as soft hair.

Figure 15:
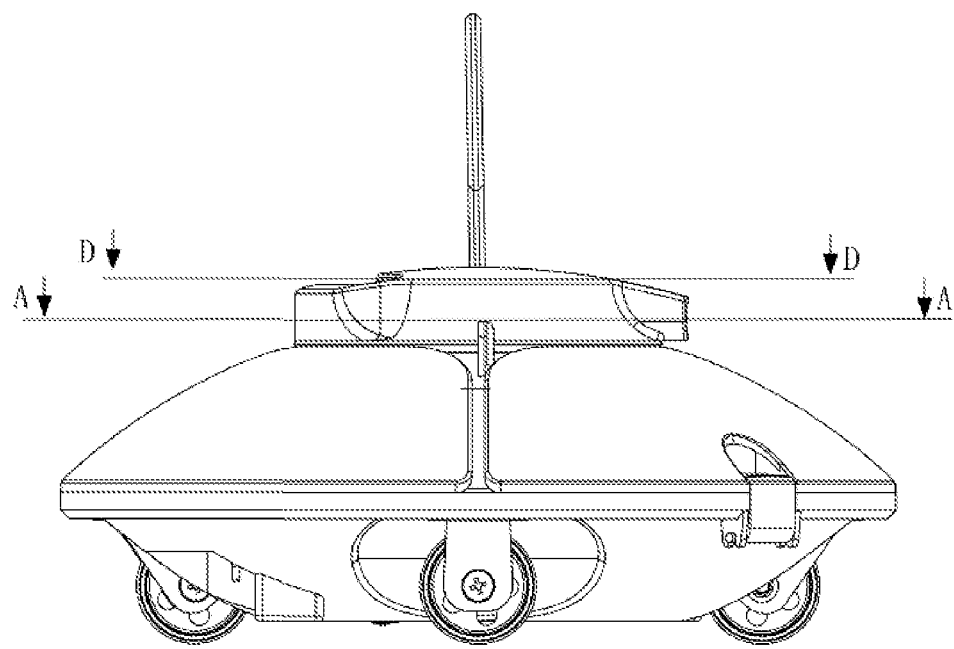
FIG. 15 is a front view of the schematic structure diagram according to example 1 of the present invention.
Figure 16:
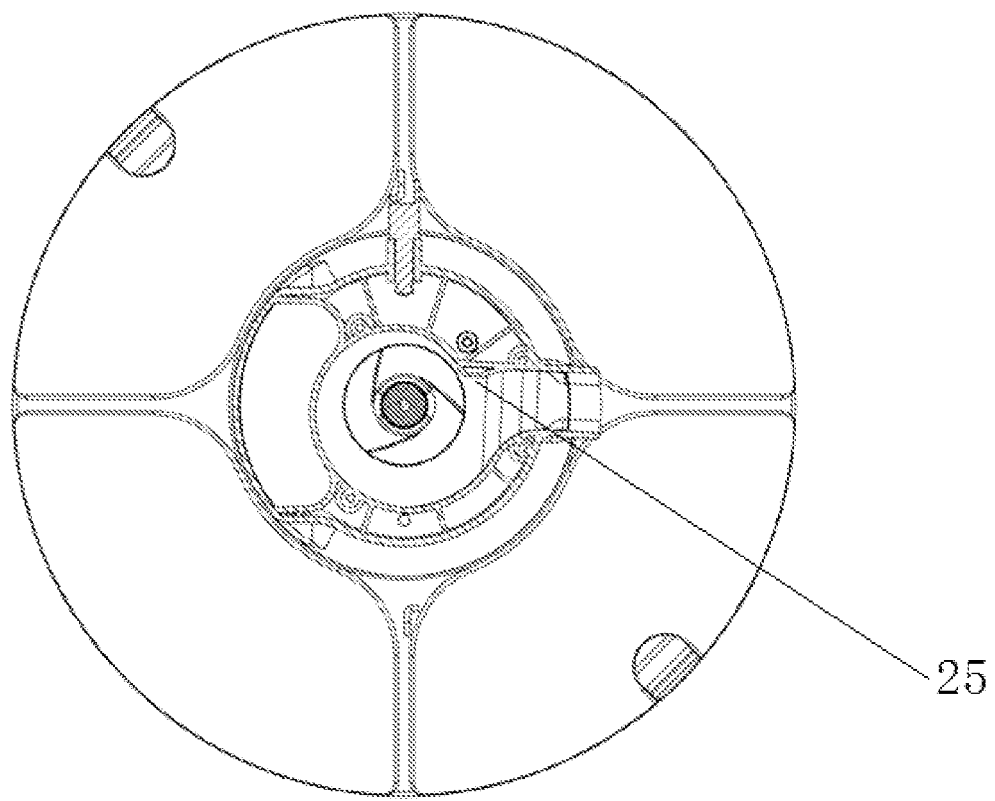
FIG. 16 is a sectional view taken along lines A-A of FIG. 15.

As shown in FIG. 15 and FIG. 16, to increase the coupling force between the suction assembly 3 and the rotating assembly, the coupling surface 25 is arranged on the inner wall of the rotating assembly. Specifically, the coupling surface 25 is arranged on the inner wall at the joint of the water channel 5 and the water outlet 2 of the inner casing structure 5. The coupling surface 25 is a planar structure and fixedly mounted on the inner wall of the rotating assembly. Preferably, the coupling surface 25 is integrally formed with the inner wall of the rotating assembly to increase the coupling force between the suction assembly 3 and the rotating assembly, providing a satisfied rotating speed of the rotating assembly.

Figure 17:
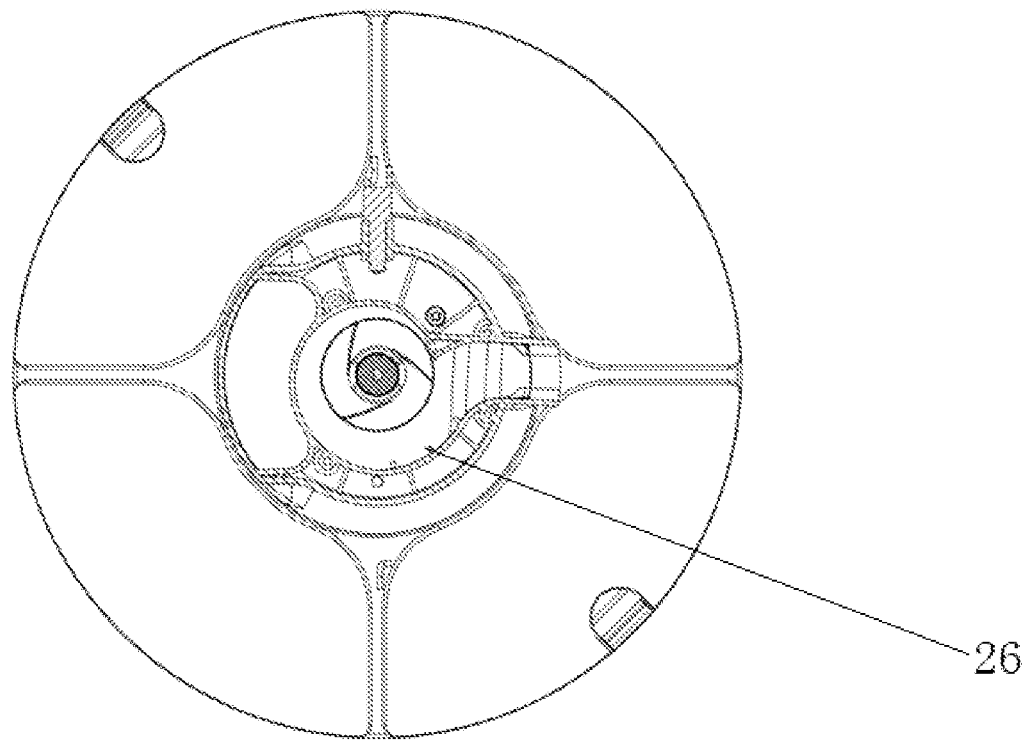
FIG. 17 is another sectional view taken along lines A-A.

As shown in FIG. 17, to increase the coupling force between the suction assembly 3 and the rotating assembly, the kinetic energy transfer piece 26 is arranged on the inner wall of the rotating assembly. Specifically, a plurality of kinetic energy transfer pieces 26 are fixedly mounted on the inner wall of the inner casing structure 5. The kinetic energy transfer pieces 26 extend into the water channel to change the torque transferred by water and increase the coupling force. The plurality of kinetic energy transfer pieces 26 can be mounted on the inner wall of the inner casing structure 5 at equal intervals, or fixedly mounted on the inner wall of the inner casing structure 5 at unequal intervals, or arranged in other manners, which can be selected as required in practice and will not be specified here. The kinetic energy transfer pieces 26 and the inner casing structure are preferably integrally formed for the fixed connection. Here, the kinetic energy transfer piece 26 is preferably a blade.

Figure 18:
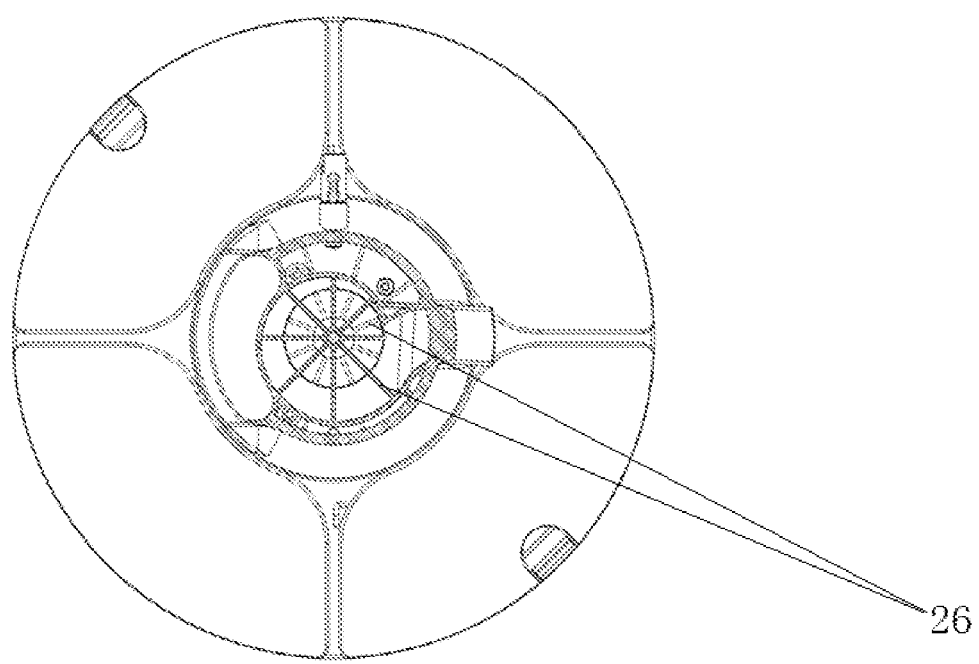
FIG. 18 is a sectional view taken along lines D-D of FIG. 15.
Figure 19:
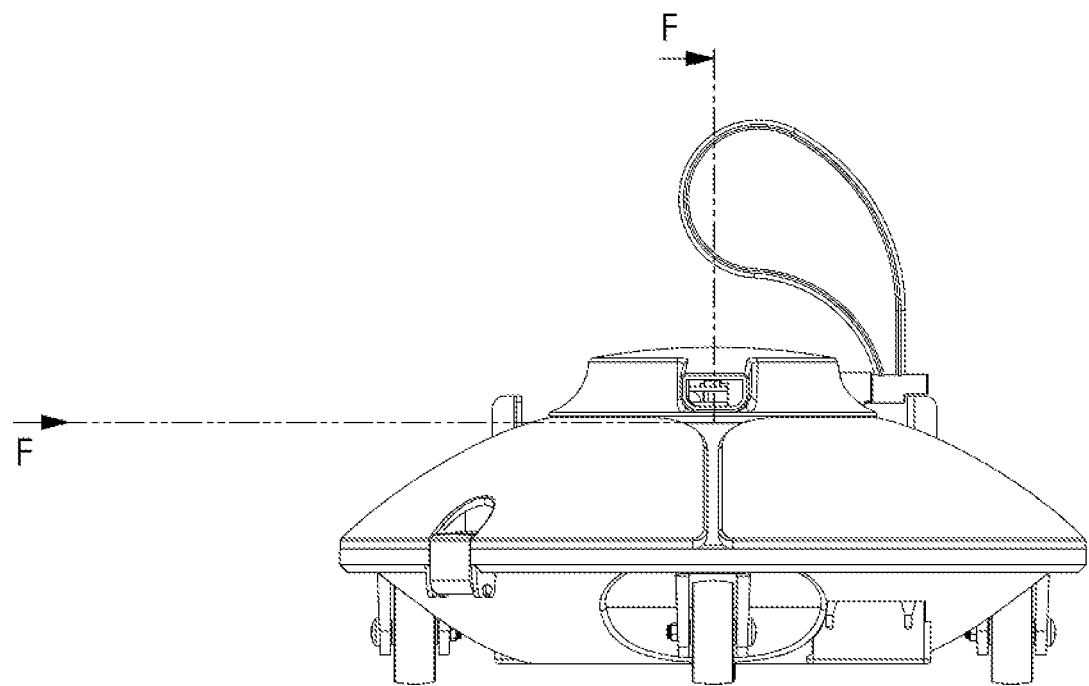
FIG. 19 is an overall schematic structure diagram according to example 1 and example 3 of the present invention.
Figure 20:
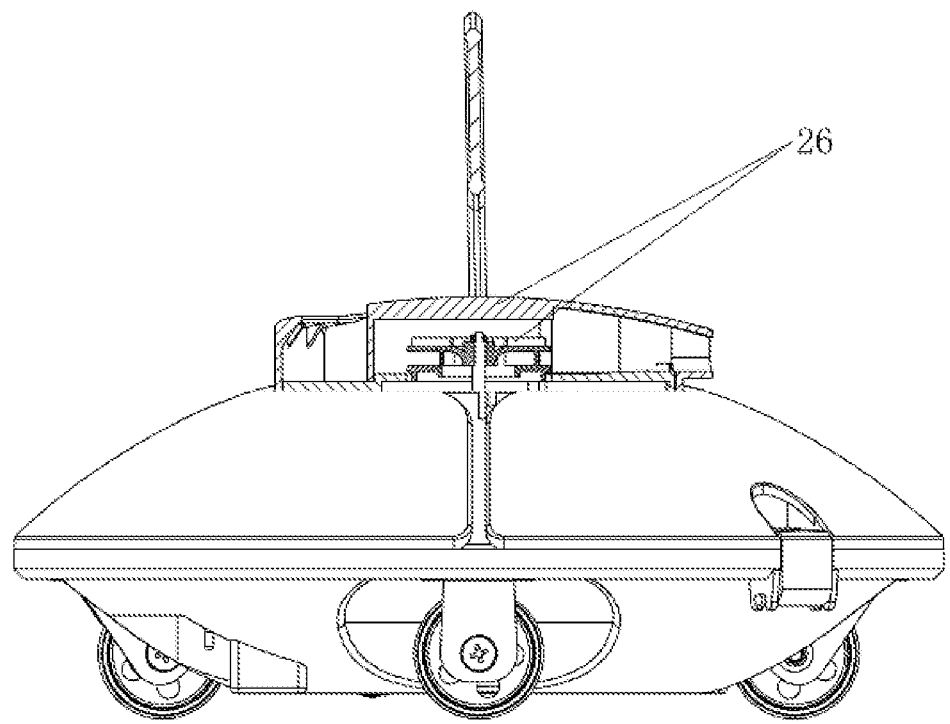
FIG. 20 is a sectional view along F-F direction of FIG. 19 according to example 1.

As shown in FIGS. 18-20, a plurality of kinetic energy transfer pieces 26 can be fixedly mounted on the suction assembly 3. Alternatively, a plurality of kinetic energy transfer pieces 26 are fixedly mounted on the top inner wall of the inner casing structure 5. Alternatively, a plurality of kinetic energy transfer pieces 26 are fixedly mounted on the top inner wall of each of the suction assembly 3 and the inner casing structure 5. When the kinetic energy transfer pieces 26 are fixedly mounted on both the suction assembly 3 and the inner casing structure 5, the kinetic energy transfer pieces 26 for the suction assembly 3 are located at the top of the suction assembly 3, and other kinetic energy transfer pieces 26 are mounted on the top inner wall of the inner casing structure 5 corresponding to the top of the suction assembly 3, so that the kinetic energy transfer pieces 26 on the suction assembly 3 correspond to the kinetic energy transfer pieces 26 on the top inner wall of the inner casing structure 5, thereby facilitating the transfer of torque of the suction assembly 3 and increasing the coupling force between the suction assembly 3 and the rotating assembly. The number of the kinetic energy transfer pieces 26 is selected as required in practice, which will not be specified here. Here, the kinetic energy transfer piece 26 is preferably a blade.

When the rotating section is mounted, the inner casing structure 5 and the suction assembly 3 are arranged coaxially. In order to form the water channel 4 of the inner casing structure 5, the bottom plate 18 is mounted at the open end 50 of the inner casing structure. That is, the open end 50 of the inner casing structure is closed mounted with the bottom plate 18. The bottom plate 18 is fixedly connected to the open end 50 of the inner casing structure, and the casing of the inner casing structure 5 and the bottom plate 18 define the water channel 4 for water to flow therethrough, so that the filtered water flows through and is drained out of the water channel 4. Furthermore, the through hole 180 is formed on the bottom plate 18, facilitating the mounting of the suction assembly 3 in the inner space of the inner casing structure 5. The center line of the through hole 180 coincides with the axis of the inner casing structure 5, i.e., the two are arranged coaxially. The axis of the inner casing structure 5 coincides with the axis of the suction assembly 3, so that the inner casing structure 5 is actuated to rotate by the torque of the suction assembly 3 transferred by water with the rotation of the suction assembly 3, thereby driving the rotating section to rotate and causing the inner casing structure 5 and the suction assembly 3 to rotate in the same direction. The diameter of the through hole 180 on the bottom plate 18 is adapted to the size of the suction assembly 3, so that the suction assembly 3 is convenient to mount and the filtered water flows into the water channel 4 inside the inner casing structure 5 via the water inlet of the centrifugal impeller of the suction assembly 3 and through the centrifugal impeller. The bottom plate 18 and the inner casing structure 5 can be fixedly connected by a connecting piece such as a screw, or integrally formed, or in plug-in connection with each other, or fixedly connected in other manners, which can be selected as required in practice and will not be specified here. Here, the shape of the bottom plate 18 is adapted to the shape of the open end 50 of the inner casing structure 5 in a volute shape.

Figure 7:
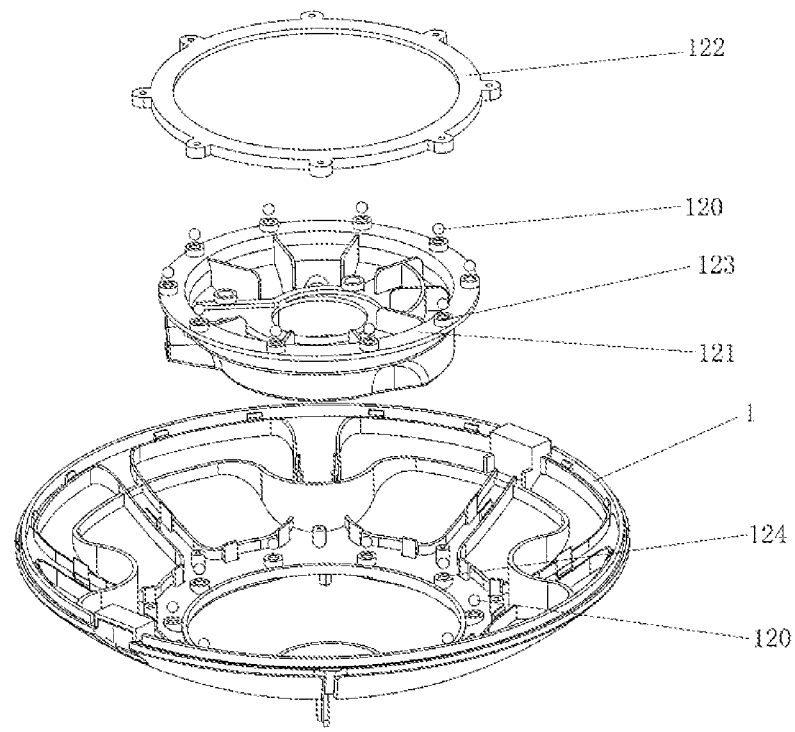
FIG. 7 is an exploded view of a rotary direction-changing assembly and a cleaner housing in connection according to an example of the present invention.
Figure 8:
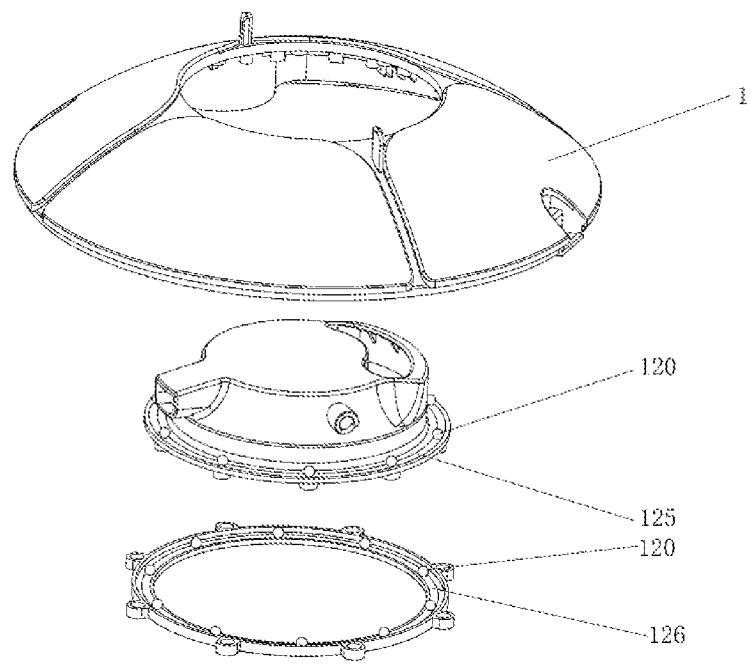
FIG. 8 is an exploded view of a rotary direction-changing assembly and a cleaner housing in connection from another view according to an example of the present invention.
Figure 9:
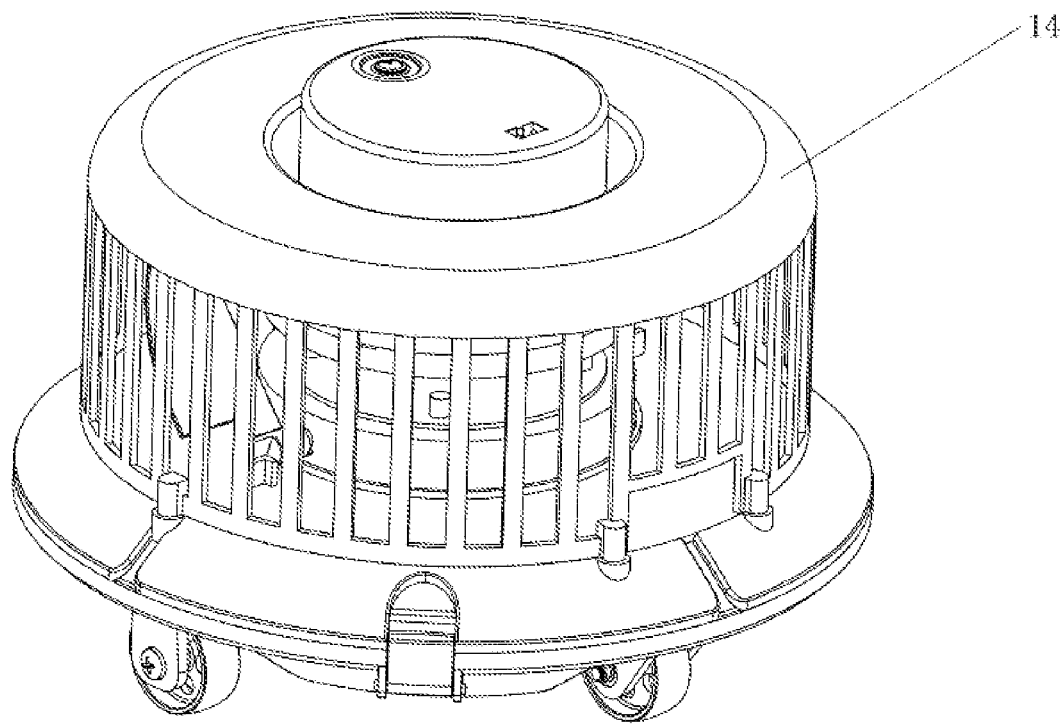
FIG. 9 is a schematic structure diagram of example 2 of the present invention.
Figure 10:
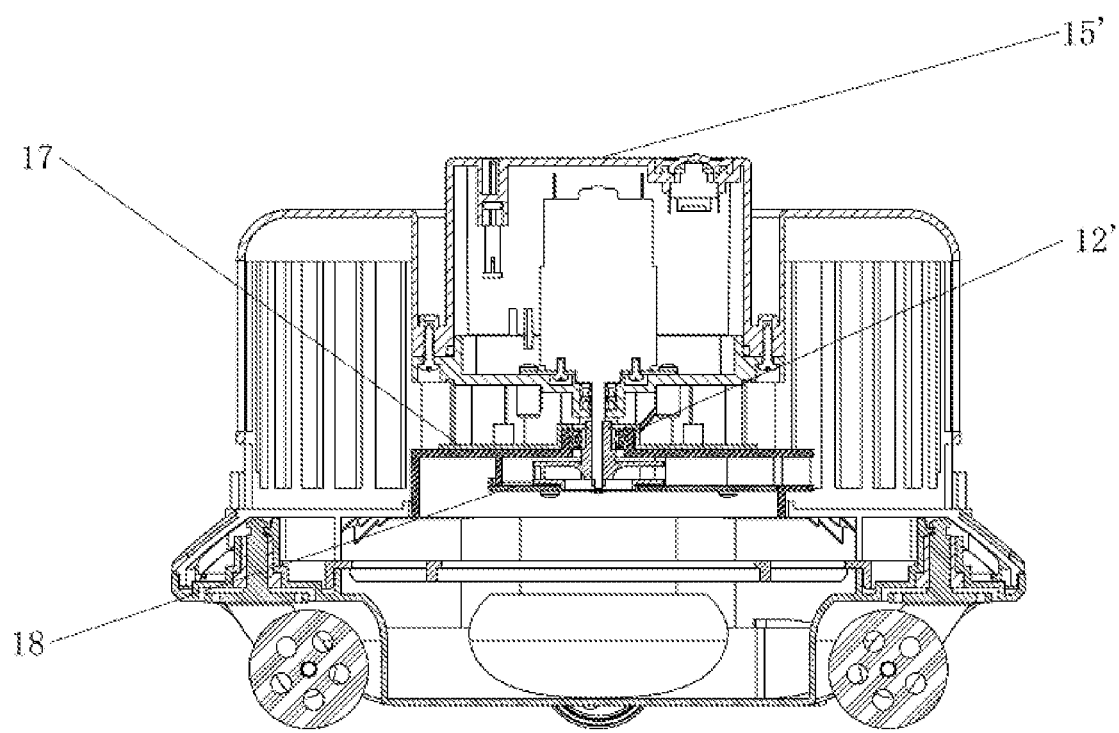
FIG. 10 is a sectional view of FIG. 9.

The turning section 12 is fixedly mounted at the open end 60 of the outer casing structure or at the through hole 180 of the bottom plate 18, which can be selected as required in practice. In this example, the turning section 12 is fixedly mounted at the open end 60 of the outer casing structure. As shown in FIGS. 7-8, the turning section 12 includes at least one group of rolling pieces 120, the rolling supporting piece 121 and the supporting piece 122. The rolling supporting pieces 121 are fixedly connected to an edge of the open end of the outer casing structure 6, and the supporting piece 122 is fixedly connected to the inner wall of the cleaner housing 1. Here, two groups of rolling pieces 120 are provided, which are in rolling connection with the cleaner housing 1, the rolling supporting piece 121 and the supporting piece 122, respectively. The mounting holes 123 are formed in one side face of the rolling supporting piece 121. The mounting hole 123 is in a shape adapted to the shape of the rolling piece 120 for holding the rolling piece. The sliding groove 125 is formed in the other side face of the rolling supporting piece 121. The position of the groove 125 corresponds to the position of each mounting hole 124 formed on the inner wall of the cleaner housing 1. The mounting hole 124 is in a shape adapted to the shape of the rolling piece 120 for holding the rolling piece 120. The sliding groove 126 is formed in a side face of the supporting piece 122. Here, the rolling piece 120 is a roll ball mounted in the mounting hole 123 of the rolling supporting piece 121. Meanwhile, the roll ball is mounted in the mounting hole 124 of the cleaner housing 1. When mounted, the rolling supporting piece 121 is located between the cleaner housing 1 and the supporting piece 122. The position of the groove 126 on the support piece 122 corresponds to the position of each mounting hole 123 on the rolling supporting piece 121. Meanwhile, the position of the groove 125 on the rolling supporting piece 121 corresponds to the position of each mounting hole 124 on the inner wall of the cleaner housing 1. After the rolling supporting piece 121 is mounted, the roll balls located in the mounting holes 123 of the rolling supporting piece 121 are also in contact with the groove 126 on the supporting piece 122, and the roll balls located in the mounting holes 124 on the inner wall of the cleaner housing 1 are also in contact with the groove 125 on the rolling supporting piece 121, so that the rolling supporting piece 121 rotates between the supporting piece 122 and the inner wall of the cleaner housing 1 under the action of the upper and lower layers of roll balls, thereby allowing the entire rotating assembly to rotate on the cleaner housing 1. Here, a plurality of mounting holes 123 are formed on the rolling supporting piece 121, a plurality of the mounting holes 124 are formed on the inner wall of the cleaner housing 1, and the number of the mounting holes 123 can be equal or unequal to the number of the mounting holes 124, which can be selected as required in practice and will not be specified here. The rolling supporting piece 121 and the outer casing structure 6 can be fixedly connected, or integrally formed, or connected by a connecting piece such as a screw, or fixedly connected in other manners, which can be selected as required in practice and will not be specified here. Preferably, the rolling supporting piece 121 is integrally formed with the outer casing structure 6 here, and such a structure is stable and not prone to deformation with long service life.

Here, the first group of rolling pieces 120 is located between the rolling supporting piece 121 and the cleaner housing 1, and the second group of rolling pieces 120 is located between the rolling supporting piece 121 and the supporting piece 122.

The turning section 12 may also include only one group of rolling pieces 120. In this case, a sliding groove is formed on the supporting piece 122, and a sliding groove instead of mounting holes is formed on the inner wall of the cleaner housing 1. Mounting holes instead of mounting holes are formed on the rolling supporting piece 121. The mounting hole is sized and shaped to conform to the size and shape of the rolling piece 120, facilitating embedding the rolling piece 120 on the rolling supporting piece 121. The rolling piece 120 is mounted in each mounting hole of the rolling supporting piece 121 and capable of rotating freely. In addition, the upper portion of each rolling piece 120 is located in the sliding groove on the inner wall of the cleaner housing 1, and the lower portion of the rolling piece 120 is located in the sliding groove of the supporting piece 122, so that the rolling supporting piece 121 can freely rotate between the supporting piece 122 and the cleaner housing 1 under the action of the rolling pieces 120, thus allowing the entire rotating assembly to rotate relative to the cleaner housing 1 under the action of the coupling force transferred by the suction assembly 3 and water.

Alternatively, as shown in FIGS. 23-26, the turning section includes the rolling supporting piece 121, the supporting piece 122, the rollers 29, the stop pieces 31 and at least one group of rolling pieces 120, where the rolling supporting piece 121 is fixedly connected to the bottom plate 18, while the supporting piece 122 is fixedly connected to the cleaner housing 1, and the rolling pieces 120 are in rolling connection with the rolling supporting piece 121 and the supporting piece 122, respectively. That is, the supporting piece 122 is fixedly mounted at the opening of the cleaner housing 1, and a side face of the supporting piece 122 toward the outer casing structure 6 is flat to facilitate rolling of the rolling pieces 120. The track 32 is arranged at one end, far away from the joint with the cleaner housing 1, of the supporting piece 122. That is, an end of a side face, back on to the outer casing structure 6, of the supporting piece 122 is recessed inwardly to form a groove, and an end of a side face, toward the outer casing structure 6, of the supporting piece 122 is not recessed inwardly, so that the cross-sectional shape of the end of the supporting piece 122 is approximate to inverted L. The top of the inwardly recessed side is inclined toward the center of the track 32 to form the inclined face 33. That is, the cross-sectional shape of the track 32 is approximate to an inverted L with an included angle of greater than 90 degrees between the inclined face 33 and the track face in the vertical direction. The supporting piece 122 and the cleaner housing 1 can be fixedly connected by a connecting piece such as a bolt, or integrally formed, or fixedly connected in other manners, which can be selected as required in practice and will not be specified here.

The rolling supporting piece 121 is fixedly connected to an edge of the bottom plate 18, and mounting holes are formed on the rolling supporting piece 121. The shape of the mounting hole is adapted to the shape of the rolling piece 120. That is, the cross-sectional shape of the mounting hole is an arc shape, thereby facilitating the mounting of the rolling piece 120 in the mounting hole. Thus, the rolling piece 120 may not be disengaged from the mounting hole during rolling, thereby being conducive to rolling of the rolling piece 120 on the rolling supporting piece 121 and the supporting piece 122. The fixed connection of the rolling supporting piece 121 and the bottom plate 18 can be achieved by integral formation, or by a connecting piece such as a bolt, or in other manners, which can be selected as required in practice and will not specified here. Here, one group of rolling pieces 120 is provided.

A plurality of columns 30 are arranged on a side face, away from the inner casing structure 5, of the bottom plate 18. The plurality of columns 30 are evenly distributed in a circle with the rotation axis of the rotating assembly as the center. Mounting holes are formed in the inner casing structure 5. The position of each mounting hole corresponds to the position of each column 30, thereby facilitating connection of the bottom plate 18 and the inner casing structure 5. A through hole is formed in each column 30 and a screw is screwed into the mounting hole of the inner casing structure 5 through the through hole, so that the bottom plate 18 and the inner casing structure 5 are connected together.

The roller 29 is arranged on the column 30 and can rotate relative to the column 30 while rolling along the track 32 on the supporting piece 122. Moreover, the position of the column 30 and the shape and size of the roller 29 are coordinated with the track 32, so that the roller 29 is blocked by the track 32 in radial and axial directions while rolling along the track 32. Thus, limitation in the radial and axial directions is achieved, preventing the rotating assembly from displacement. Specifically, the side face 34 of the roller 29 can be in the shape of a flat surface or a conical surface. Irrespective of which shape is adopted, the included angle between the side face 34 of the roller 29 and the rolling face of the roller 29 in the vertical direction is smaller than the included angle of the approximately inverted L-shaped cross section of the track 32. Thus, the side face 34 of the roller 29 is not in contact with the inclined face 33 of the track 32 while the maximum-diameter portion of the roller 29 is in rolling contact with the track 32, thereby guaranteeing that the roller 29 can roll relative to the track 32 and realizing that the roller 29 is blocked by the track 32 in the axial direction. As a result, the rotating assembly can rotate along the through hole of the cleaner housing 1, and meanwhile, the rotating assembly is completely limited in the axial direction and the radial direction under the combined action of the rolling supporting piece 121, the rolling pieces 120 and the supporting piece 122.

Meanwhile, the stop piece 31 is arranged at an end of the column 30 to block the roller 29. The stop piece 31 is arranged at a position where the screw is in contact with the column 30. The diameter of the stop piece 31 is greater than the diameter of the roller 29, thereby preventing the separation of the roller 29 from the column 30. The stop piece 31 can be fastened to the end of the column 30 by a screw. Thus, the stop piece 31 is fixed to the end of the column 30. Alternatively, a certain gap is formed between the cap of the screw and the column 30, allowing the stop piece 31 to rotate relative to the screw and reducing resistance to the roller 29 in rotation. Preferably, the stop piece 31 is a gasket.

Figure 13:
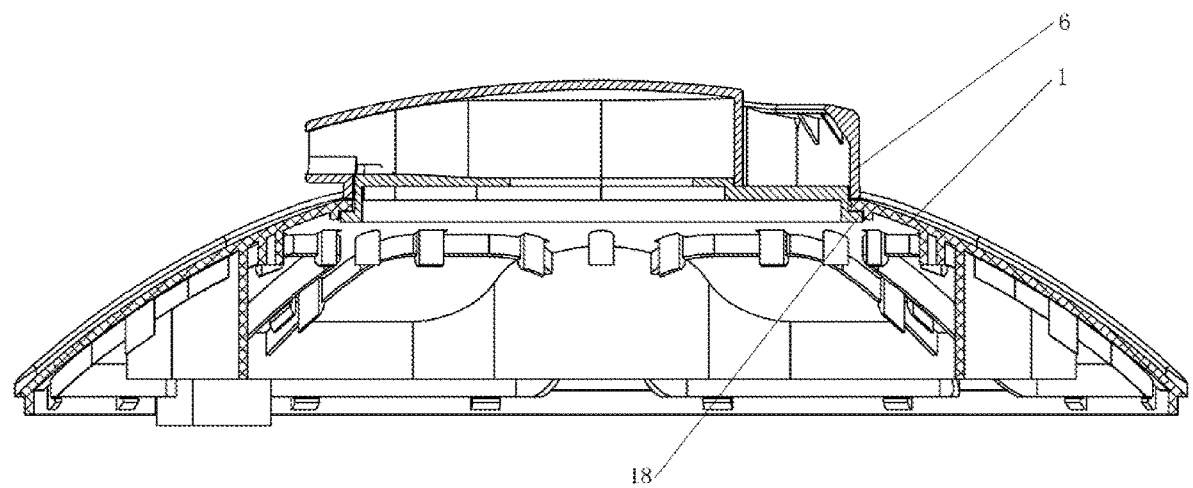
FIG. 13 is another schematic structure diagram showing a connection of a rotating assembly and a cleaner housing according to example 1 of the present invention.
Figure 14:
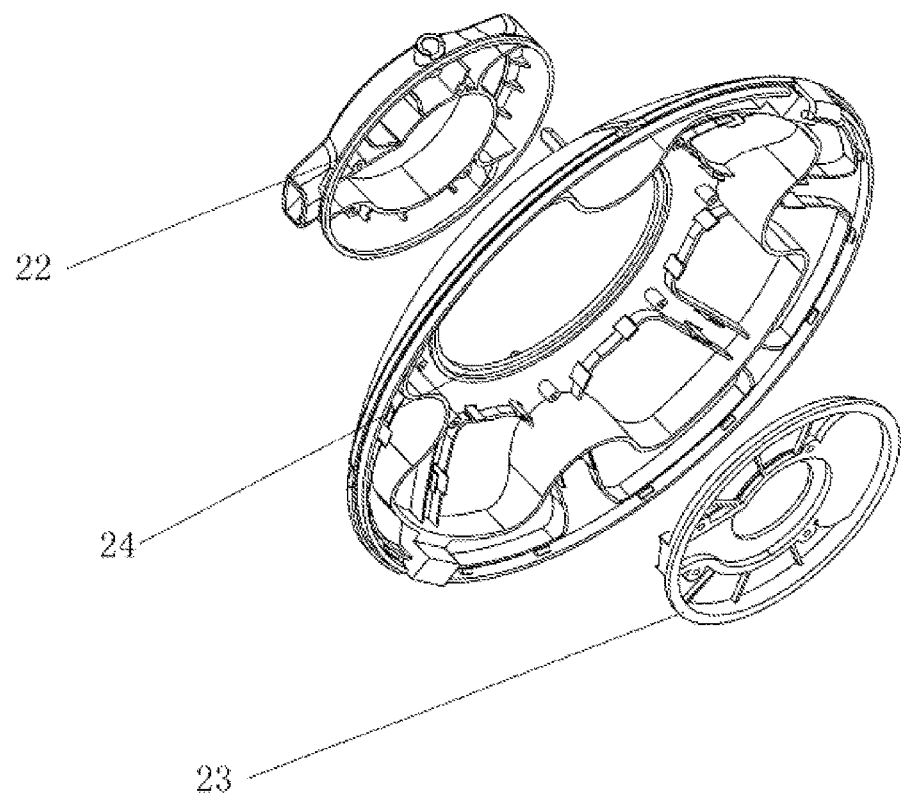
FIG. 14 is an exploded view of FIG. 13.

Alternatively, the rotating assembly is connected to the cleaner housing in a sliding manner with no rolling piece, sliding groove or mounting hole. As shown in FIGS. 13-14, the turning section includes the upper rotating plate 22 and the lower rotating plate 23. The upper rotating plate 22 is fixedly connected to the open end 60 of the outer casing structure 6, while the lower rotating plate 23 is fixedly connected to the bottom plate 18, and a gap is formed between the upper rotating plate 22 and the lower rotating plate 23. The upper open end 24 of the cleaner housing is arranged between the upper rotating plate 22 and the lower rotating plate 23. Besides, the upper open end 24 of the cleaner housing is in clearance fit with the upper rotating plate 22 and the lower rotating plate 23, so that the rotating assembly rotates relative to the cleaner housing. Here, the shape of the bottom plate 18 is adapted to the shape of the lower rotating plate 23, and the shape of the lower rotating plate 23 is adapted to the shape of the upper open end 24 of the cleaner housing, so that the upper open end 24 of the cleaner housing is arranged between the upper rotating plate 22 and the lower rotating plate 23. In addition, a wear-resistant lubricating piece can be arranged between the upper open end 24 of the cleaner housing 1 and the upper rotating plate 22 and/or the lower rotating plate 23, so that frictional resistance is reduced and the service life is prolonged.

The above direction-changing assembly includes the resistance plate 8 and the rotating piece 9. The resistance plate 8 is fixedly connected to the rotating piece 9. The rotating piece 9 is rotatably connected to the rotating assembly. The resistance plate 8 is a plate-like structure having a certain area, so that the resistance plate 8 is tilted backwards under the resistance of water when the cleaner travels and resets automatically when the cleaner stops traveling. The reset of the resistance plate 8 can be realized by buoyancy, or by gravity, or by elasticity, or in other manners, which can be selected as required in practice.

In case of reset by buoyancy, a buoyancy chamber is arranged on the resistance plate 8, and a buoyancy material is placed in the buoyancy chamber. Alternatively, the resistance plate 8 is made of a material that is buoyant in water, allowing the reset of the resistance plate 8 under the action of buoyancy.

In case of reset by elasticity, a torsion spring is mounted at the joint of the rotating piece 9 and the outer casing structure 6, so that the resistance plate 8 resets under the action of the elastic force of the torsion spring.

In case of reset by gravity, a clump weight is arranged on the resistance plate 8, or the resistance plate 8 is made of a non-buoyant appropriately weighted material, allowing the reset of the resistance plate 8 under the action of gravity.

The above rotating piece 9 is a rotating shaft. One end of the rotating shaft is rotatably connected to the rotating assembly through shaft-hole cooperation. The arresting portion 11 is arranged at the other end of the rotating shaft. The arresting portion 11 cooperates with the arresting assembly 10 to control arrest and moving of the rotating assembly. The rotating shaft is a shaft structure. The arresting portion 11 is fixedly connected to the free end of the rotating shaft. The arresting portion 11 and the rotating shaft can be integrally formed, or fixedly connected by a connecting piece such as a screw, or fixedly connected in other manners, which can be selected as required in practice and will not specified here. The arresting portion 11 can be a semi-cylindrical structure having a planar portion intersecting with the plane where the resistance plate 8 is located. The arresting portion 11 can also be a plate-like structure, a plane where the plate-like structure is located intersects with the plane where the resistance plate 8 is located. Besides, the arresting portion can also be a diamond-shaped columnar structure or other structures. The specific shape can be selected as required in practice. The arresting portion 11 cooperates with the arresting assembly 10. When the resistance plate 8 is upright, the lowest end of the arresting portion 11 is higher than the top end of the arresting assembly 10, and the arresting assembly 10 does not block the arresting portion 11. When the rotating assembly rotates, the resistance plate 8 is tilted backwards and the rotating shaft rotates. In this case, the lowest end of the arresting portion 11 is below the top end of the arresting assembly 10 and the arresting portion 11 comes in contact with the arresting assembly 10, resulting in that the arresting portion 11 is blocked by the arresting assembly 10. Thus, the arrest and moving of the rotating assembly are achieved, and then direction changing of the cleaner can be achieved. At least one direction-changing assembly is present, which cooperates with the arresting assembly 10 and can be selected according to the number of arresting assemblies 10.

At least one arresting assembly 10 is present. The arresting assembly 10 is a columnar structure, or a plate-like structure, or a diamond-shaped columnar structure, or other structures, which can be selected as required in practice and will not be specified here. The arresting assembly 10 is fixedly mounted on the outer wall of the cleaner housing 1, and the height of the arresting assembly 10 is adapted to the arresting portion 11 on the rotating shaft. When the resistance plate 8 is upright, the top end of the arresting assembly 10 is below the lowest end of the arresting portion 11 without contact, and the arresting assembly 10 does not block the arresting portion 11. When the resistance plate 8 is tilted, the top end of the arresting assembly 10 is above the lowest end of the arresting portion 11 with contact, and the arresting portion 11 is blocked.

In case of one direction-changing assembly, two or more arresting assemblies 10 are provided. The rotating assembly rotates under the action of the torque of the suction assembly 3 transferred by water, and the resistance plate 8 is tilted backwards under the action of water resistance. Meanwhile, the rotating assembly drives the direction-changing assembly to rotate, while the arresting portion 11 of the direction-changing assembly is blocked by the arresting assemblies 10. The cleaner travels, with the resistance plate 8 being kept in the tilted state under the action of water resistance. When the cleaner meets a wall, the water resistance acting on the resistance plate 8 disappears, causing the resistance plate 8 to reset and the arresting portion 11 to be disengaged from the arresting assembly 10. The arresting portion 11 passes over the arresting assembly 10 and is driven by the rotating assembly to keep on rotating, causing the cleaner to travel in a different direction. The resistance plate 8 is titled backwards again under the action of water resistance and blocked by next arresting assembly 10. Then, the process is repeated to change the direction of the cleaner. The positions of the two or more arresting assemblies 10 are determined according to a predetermined traveling path of the cleaner.

In case of two or more direction-changing assemblies, the direction-changing assemblies are arranged in a circle with the axis of the rotating assembly as the center. One arresting assembly 10 is provided. The rotating assembly rotates under the action of the torque of the suction assembly 3 transferred by water to drive the direction-changing assemblies to rotate. The resistance plate 8 is tilted backwards under the action of water resistance, and the arresting portion 11 of one of the direction-changing assemblies is blocked by the arresting assembly 10. The cleaner travels, with the resistance plate 8 being kept in the tilted state under the action of water resistance. When the cleaner meets a wall, the water resistance acting on the resistance plate 8 disappears, causing the resistance plate 8 to reset and the arresting portion 11 to be disengaged from the arresting assembly 10. The arresting portion 11 passes over the arresting assembly 10 and is driven by the rotating assembly to keep on rotating, causing the cleaner to travel in a different direction. The resistance plate 8 is titled backwards again, and next direction-changing assembly is blocked by the arresting assembly 10. Then, the process is repeated to change the direction of the cleaner. The positions of the two or more direction-changing assemblies are determined according to a predetermined traveling path of the cleaner.

The filter 19 is mounted inside the cleaner housing 1 to filter water flowing into the cleaner housing 1 and trap contaminants such as debris. The filter 19 is preferably a filter screen. The filter screen and the cleaner housing 1 may define a space to hold contaminants such as debris. The water inlet 21 is formed at the bottom of the cleaner housing, allowing water to flow into the cleaner, and the water inlet cover plate 20 is mounted at the water inlet 21 and rotatably connected to the inner wall of the cleaner housing 1. The water inlet cover plate 20 is capable of rotating relative to the water inlet 21. Thus, when water flows through the water inlet 21, the water inlet cover plate 20 is opened under the impact of the water flow. Water flows into the cleaner housing 1 and is filtered by the filter 19. The filtered water flows through the water channel 4 of the inner casing structure 5 and is drained via the water outlet 2. When the driving unit 13 stops moving, the water inlet cover plate 20 resets under the action of elastic force or weight thereof, so that contaminants such as debris are trapped in the space defined by the filter 19 and the cleaner housing and prevented from leaking out to cause secondary pollution of a swimming pool. The cleaner is provided with a power source which is electrically connected to the driving unit 13 to provide electric energy for the driving unit 13. The power source may be a battery fixedly mounted in airtight fashion within the sealing device 15, or may be arranged outside the sealing device 15. The external power source is electrically connected to the driving unit 13 by the power cable 16 to provide electric energy for the driving unit 13. Alternatively, a control component is arranged inside the sealing device 15. The control component is electrically connected to a power source outside the cleaner by a power cable and electrically connected to the driving unit 13. The power source provides electric energy for the driving unit 13 through the power cable and then via the control component. Since the sealing device 15 is fixedly connected to the cleaner housing 1, the change in moment of momentum due to the interaction between water and the rotating assembly and the suction assembly 3 results in the transfer of torque of the suction assembly 3, allowing the rotating assembly and the suction assembly 3 to rotate coaxially in the same direction, and meanwhile, the sealing device 15 does not rotate and may not cause the power cable 16 to twist and entangle with the cleaner, so that the cable-powered cleaner is flexible in motion and convenient to use. As shown in FIG. 1, in this example, the power source mounted in the sealing device is a battery which is electrically connected to the driving unit 13 and serves to provide electric energy for the driving unit 13.

In this example, the working process is as follows: the mechanism for detecting obstacles and mechanically reversing (a direction of) a pool cleaner is mounted on the cleaner in such a manner that the rotating assembly is capable of rotating freely relative to the cleaner housing, where the axis of the inner casing structure 5 of the rotating assembly coincides with the axis of the suction assembly 3, and the change in moment of momentum due to the interaction between water and the suction assembly 3 and the rotating assembly results in the transfer of torque of the suction assembly 3, allowing the suction assembly 3 and the rotating assembly to rotate coaxially in the same direction. The cleaner is placed in a swimming pool. Before the cleaner is started, the resistance plate 8 of the direction-changing assembly is upright. The cleaner is started, enabling the driving unit 13 to function to drive the suction assembly 3 to rotate. The torque transferred by filtered water flowing through the water channel 4 of the inner casing structure 5 propels the rotating assembly to rotate. The resistance plate 8 is tilted backwards under the action of water resistance, causing the direction-changing assembly to rotate. When the direction-changing assembly moves to the arresting assembly 10, the arresting portion 11 of the direction-changing assembly comes in contact with the arresting assembly 10 and is thus blocked since the resistance plate 8 is in the tilted state. Accordingly, the direction-changing assembly is blocked by the arresting assembly 10, and the rotating assembly stops rotating. The water drained out of the water outlet 2 pushes the cleaner to travel. The resistance plate 8 is kept in the tilted state in a direction opposite to the moving direction under the action of water resistance. The driving unit 13 drives the rotation of the suction assembly 3 to pump the water when the cleaner is cleaning the swimming pool. The water is pumped into the cleaner and filtered by the filter. The filtered water flows into the water channel 4 of the inner casing structure 5 through the water inlet of the suction assembly 3, and the suction assembly 3 rotates to cause the filtered water to flow and be drained out of the water outlet 2 of the inner casing structure 5. The drained water provides power for the cleaner to move forward, allowing the cleaner to travel. When the cleaner meets a wall of the swimming pool or other obstacles, the cleaner stops moving forward, and the resistance of water acting on the resistance plate 8 disappears, causing the resistance plate 8 to return to the upright state. In this case, the arresting portion 11 of the direction-changing assembly is disengaged from the arresting assembly 10. The arresting portion 11 of the direction-changing assembly passes over the arresting assembly 10, and the rotating assembly rotates, so that the resistance plate 8 is tilted under the action of water resistance. Moreover, the water draining direction of the water outlet 2 is changed, resulting in a change in the direction of motion of the cleaner. When moving to next arresting assembly 10, the direction-changing assembly is blocked by the arresting assembly 10, preventing the rotating assembly from rotating with the resistance plate 8 kept in the tilted state, and the cleaner then travels according to a preset path. When the cleaner meets a wall again, the above process is repeated until every position of the swimming pool is cleaned.

Example 2

As shown in FIGS. 9-12, this example differs from example 1 in that the sealing device is fixedly mounted on the cleaner housing 1, which is specifically located outside the cleaner housing 1 and fixedly mounted at the top of the cleaner housing 1. The driving unit 13 is fixedly mounted inside the sealing device with the drive shaft of the driving unit 13 protruding from the sealing device, where the joint of the drive shaft and the sealing device is sealed with a sealing piece, thereby preventing water from flowing into the sealing device to cause damage to the driving unit 13. When mounted, the driving unit 13 is arranged upside down in the vertical direction. The drive shaft of the driving unit 13 is located at the lower portion of the sealing device. The suction assembly 3 is fixedly mounted on the drive shaft of the driving unit 13. One end of the rotary direction-changing assembly is rotatably connected to the suction assembly 3 or the drive shaft of the driving unit 13 or the sealing device, while the other end of the same is located inside the cleaner housing 1, in clearance fit with the cleaner housing 1 and capable of rotating relative to the cleaner housing 1. In this example, an opening is formed at the bottom of the sealing device, thereby facilitating the mounting of the driving unit 13. The driving unit 13 is mounted upside down inside the sealing device with the drive shaft extending out of the opening at the bottom of the sealing device. The suction assembly 3 is fixedly mounted at the free end of the drive shaft outside the sealing device, and the suction assembly 3 is located inside the rotating assembly of the rotary direction-changing assembly for pumping water. The filtered water is then allowed to flow through the water channel 4 of the rotating assembly and out of the water outlet 2. Under the action of the torque transferred by the water, the rotating assembly and the suction assembly 3 are allowed to rotate coaxially in the same direction, thereby realizing that the direction-changing assembly cooperates with the arresting assembly 10 and allowing the cleaner to travel and to achieve direction changing upon contact with a wall.

Specifically, the sealing device includes the sealing part 15' and a support part. The sealing part 15' is fixedly connected to one end of the support part 14, and the other end of the support part 14 is fixedly connected to the cleaner housing 1, so that the sealing device is fixedly mounted at the top of the cleaner housing 1. The support part 14 is configured to support the sealing part 15', so that the sealing part 15' is fixedly mounted on the cleaner housing 1. The support part 14 is a cage-shaped structure with an inner cavity which is communicated with the outside, and has openings formed at the top and bottom thereof, thereby facilitating the mounting of the sealing device. Moreover, a plurality of through holes are formed on a side wall of the cage-shaped structure, and each through hole is in a vertical bar shape, so that external water can flow into the support part 14 and water drained out of the water outlet 2 can flow out of the through holes. The support part 14 may also include a plurality of columns, with each column having one end fixedly connected to the cleaner housing 1 and the other end fixedly connected to the sealing part 15', thereby supporting the sealing part 15'. Alternatively, the support part 14 is a box-like structure having a plurality of penetrating draining outlets, and the sealing part 15' is mounted inside the box-shaped structure, with each draining outlet corresponding to the water outlet of the rotating section. Alternatively, the support part 14 may also be other structures, which can be selected as required in practice and will not be specified here. The sealing part 15' is a box structure with a space inside, and the driving unit 13 is fixedly mounted inside the sealing part 15'. The support part 14 is located along the circumference of the sealing part 15' with a certain gap between the support part 14 and the sealing part 15'. The gap is adapted to the size of the rotary direction-changing assembly, so that the motion of the direction-changing assembly does not interfere with the support part 14 and may not be affected when the direction-changing assembly rotates along with the rotating assembly. The sealing part 15' and the support part 14 can be fixedly connected by a connecting piece such as a screw, or integrally formed, or in plug-in connection with each other, or connected by a latch fastener, or fixedly connected in other manners, which can be selected as required in practice and will not be specified here. Preferably, the sealing part 15' and the support part 14 are integrally formed, and such a structure is stable with long service life.

A certain gap is formed between the bottom of the sealing part 15' and the cleaner housing 1, thereby facilitating the mounting of the suction assembly and the rotary direction-changing assembly. An opening is formed at the top of the cleaner housing 1, so that the open end of the rotating assembly is inserted into the cleaner housing 1, and this portion is in clearance fit with the cleaner housing 1, so that the rotating assembly can rotate relative to the cleaner housing 1. The water outlet 2 of the rotating assembly is located outside the cleaner housing 1, and the rotating assembly has an opening formed in the portion thereof inside the cleaner housing 1, facilitating inflow of the filtered water to the rotating assembly. The water outlet 2 is located outside the cleaner housing, facilitating draining of the filtered water. An included angle between the water draining direction of the water outlet 2 and the horizontal plane is less than 90 degrees, facilitating the application of thrust to the cleaner.

The rotating section of the rotating assembly includes the inner casing structure 5. The open end 50 of the inner casing structure 5 is located inside the cleaner housing 1. A through hole is formed at the top of the inner casing structure 5. A center line of the through hole coincides with the axis of the through hole 180 at the bottom plate 18 of the inner casing structure 5, i.e., the two are arranged coaxially. The through hole 180 at the bottom plate 18 of the inner casing structure 5 facilitates inflow of the filtered water to the water channel of the inner casing structure 5, while the through hole at the top of the inner casing structure 5 facilitates extending of the drive shaft of the driving unit 13 into the inner casing structure 5 via the through hole, thus facilitating the mounting of the suction assembly 3 in the water channel 4 of the inner casing structure 5. Moreover, the suction assembly 3 is fixedly connected to the drive shaft of the driving unit 13, so that the rotating section is arranged coaxially with the suction assembly 3. The axis of the suction assembly 3 coincides with the axis of the inner casing structure 5, so that the rotating section rotates coaxially under the action of the torque of the suction assembly 3 transferred by water. The filtered water is drained out of the water outlet 2 of the water channel 4 of the inner casing structure 5, so that the filtered water drained out of the water outlet applies thrust to the cleaner, allowing the cleaner to travel.

The rotating section can also include the inner casing structure 5 and the outer casing structure 6. With the same structure as the rotating section in example 1, the open end 60 of the outer casing structure is located inside the cleaner housing and in clearance fit with the cleaner housing. The structure of the rotating section can be selected as required in practice, which will not be specified here.

The turning section 12' is mounted at the through hole at the top of the inner casing structure 5. The turning section 12' is connected to the rotating section, and connected to the suction assembly 3 or the driving unit 13 or the sealing device, respectively, so that the rotating section can rotate in the same direction with the drive shaft of the driving unit 13 or the suction assembly 3. The turning section 12' can be fixedly mounted on the drive shaft of the driving unit 13, or fixedly mounted on the suction assembly 3, or fixedly mounted on the sealing device, which can be selected as required in practice. Moreover, the turning section 12' is connected to the inner wall of the through hole at the top of the inner casing structure 5. Specifically, in this example, the mounting of the turning section 12' will be described by taking the example of the turning section 12' being fixedly mounted on the suction assembly 3. The turning section 12' is configured to support the rotating section, ensuring that the rotating section can rotate freely, which can be any component that is capable of realizing fixation and reducing a load coefficient of friction during mechanical transmission, allowing the rotating section to be driven by the suction assembly 3 to rotate. Here, the turning section is preferably a bearing. The inner race of the bearing is fixedly mounted on the outer wall of a hub of the suction assembly 3. The hub of the suction assembly 3 is a stepped shaft structure, which is smaller in diameter at a position where the bearing is mounted. The inner race of the bearing cooperates with the hub, and an end of the inner race of the bearing comes in contact with the shoulder of the hub. Moreover, a retainer ring is fixedly mounted on the hub at the other end of the inner race of the bearing to limit the inner race of the bearing in the axial direction, thereby preventing the inner race of the bearing from moving up and down when the suction assembly 3 rotates. The outer race of the bearing cooperates with the through hole at the top of the inner casing structure 5 of the rotating section, and is fixedly mounted in and in interference or transition fit with the through hole. A lug boss is arranged on the inner wall of the through hole. One end of the outer race of the bearing is in contact with the lug boss, while the other end of the outer race of the bearing is in contact with the first baffle 17 arranged outside the rotating section, so that the outer race of the bearing is limited and prevented from moving up and down when the suction assembly 3 rotates. The shape of the first baffle 17 is adapted to the shape of an upper casing of the rotating section. The first baffle 17 is fixedly mounted on the outer wall of the upper casing of the rotating section, and a through hole at the top of the first baffle 17 is smaller than the through hole at the top of the inner casing structure 5 of the rotating section in diameter, thereby facilitating limiting of the outer race of the bearing. The first baffle 17 and the casing of the rotating section can be fixedly connected by a connecting piece such as a screw, or integrally formed, or fixedly connected in other manners, which can be selected as required in practice and will not be specified here. Here, the bearing is a commercially available product, which can be selected as required in practice and will not be specified here.

The bottom plate 18 of the water channel formed by the inner space of the inner casing structure 5 of the rotating section and the inner casing structure 5 can be integrally formed, or fixedly connected by a connecting piece such as a screw, or fixedly connected in other manners, which can be selected as required in practice and will not be specified here. In order to facilitate the mounting of the suction assembly 3, the bottom plate 18 is fixedly connected to the bottom open end face of the inner casing structure 5 by a connecting piece such as a screw. The position of the through hole 180 at the bottom plate 18 corresponds to the position of the suction assembly 3, so that the filtered water flows into the inner casing structure 5 under the action of the suction assembly 3 and through the water channel 4 of the inner casing structure 5 and is then drained out of the water outlet 2.

The suction assembly 3 is mounted on the drive shaft of the driving unit 13, located in the space of the water channel 4 of the inner casing structure 5, and adapted to the water channel 4 of the inner casing structure 5. The suction assembly 3 is preferably a centrifugal impeller. The inner casing structure 5 is a volute structure, so that the filtered water flows through the water channel 4 and is drained out of the water outlet 2 under the action of the centrifugal force generated by the rotation of the suction assembly 3, thereby providing thrust for the cleaner to travel. The impeller is fixedly mounted on the drive shaft of the driving unit 13, and a limiting piece is mounted at an end of the drive shaft. The impeller is limited by the limiting piece and thus prevented from being disengaged from the drive shaft when rotating. The limiting piece is preferably a limiting nut.

Figure 11:
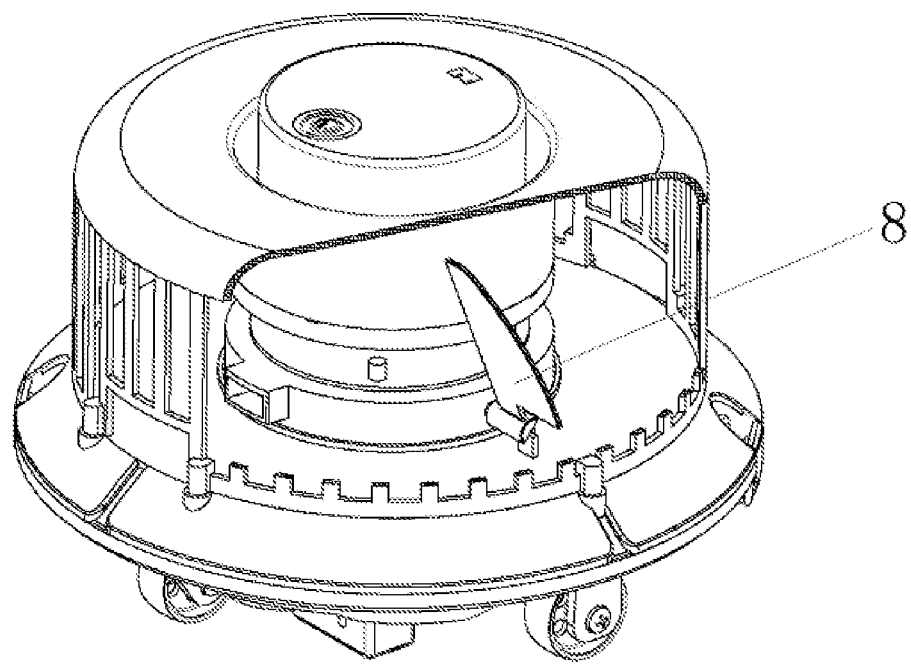
FIG. 11 is a partially sectioned view showing the structure of example 2 of the present invention from another view.
Figure 12:
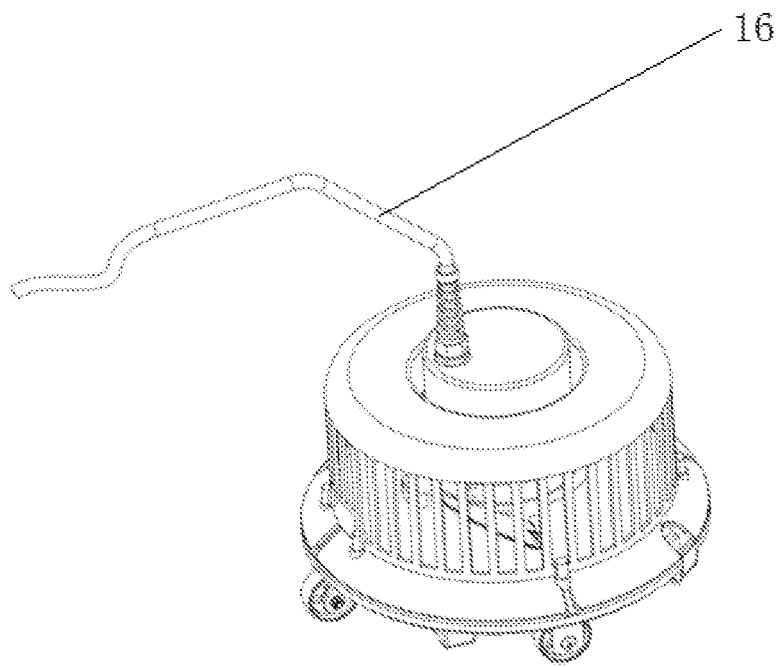
FIG. 12 is a schematic structure diagram of example 2 mounted with a power cable according to the present invention.

Other structures are the same as those in example 1, which will not be described redundantly here. When an inverted sealing device is adopted, it is more convenient to use external power supply. As shown in FIG. 12, when the power cable 16 is electrically connected to the driving unit 13 hermetically mounted in the sealing part 15', the sealing device does not rotate and prevents the power cable 16 from twisting and thus having no effect on the travel and movement of the cleaner. In addition, the cleaner can also be powered by an internal power source. As shown in FIG. 11, the power source mounted in the sealing device is a battery which is electrically connected to the driving unit 13 and provides electric energy for the driving unit 13.

In this example, the working process is as follows: the mechanism for detecting obstacles and mechanically reversing (a direction of) a pool cleaner is mounted on the cleaner housing. The cleaner is placed in a swimming pool. When the cleaner is in static condition, the resistance plate 8 of the direction-changing assembly is upright. The cleaner is started, enabling the driving unit 13 to function to drive the suction assembly 3 to move, thereby drawing water into the filter inside the cleaner housing for filtration. The filtered water flows into the rotating section, and is pumped into the water channel 4 of the inner casing structure 5 by the suction assembly 3 mounted in the through hole at the bottom plate 18 of the inner casing structure 5 and then drained out of the water outlet 2 through the water channel 4. Moreover, when the suction assembly 3 rotates to drive the filtered water in the inner casing structure 5 to swirl. The rotating section is driven to rotate under the action of the torque of the suction assembly 3 transferred by water, and the bearing of the turning section 12' is used to cause the rotating section to rotate along with the suction assembly 3. The resistance plate 8 is tilted in a direction opposite to the direction of rotation when the rotating assembly rotates; the arresting portion 11 of the direction-changing assembly comes in contact with the arresting assembly 10 to block the direction-changing assembly; the rotating section stops rotating; the resistance plate 8 is kept in the tilted state under the action of water resistance; and the cleaner travels under the action of thrust of water drained out of the water outlet 2 to clean the swimming pool. When the cleaner meets a wall of the swimming pool or other obstacles, the resistance of water acting on the resistance plate 8 disappears, causing the resistance plate 8 to return to the upright state; the arresting portion 11 of the direction-changing assembly is disengaged from the arresting assembly 10; the rotating section keeps on rotating; the arresting portion 11 of the direction-changing assembly passes over the arresting assembly 10 and keeps on rotating; and the water draining direction of the water outlet 2 is changed, resulting in a change in the traveling direction of the cleaner and thus achieving direction changing of the cleaner. When the rotating section rotates, the resistance plate 8 is tilted under the action of water resistance. When the direction-changing assembly rotates to next arresting assembly 10, the arresting portion 11 of the direction-changing assembly comes in contact with the arresting assembly 10; the rotating section stops rotating; and the cleaner travels under the acting force of the water drained out of the water outlet 2. When the cleaner meets a wall again, the above process is repeated until every position of the swimming pool is cleaned.

Example 3

Figure 21:
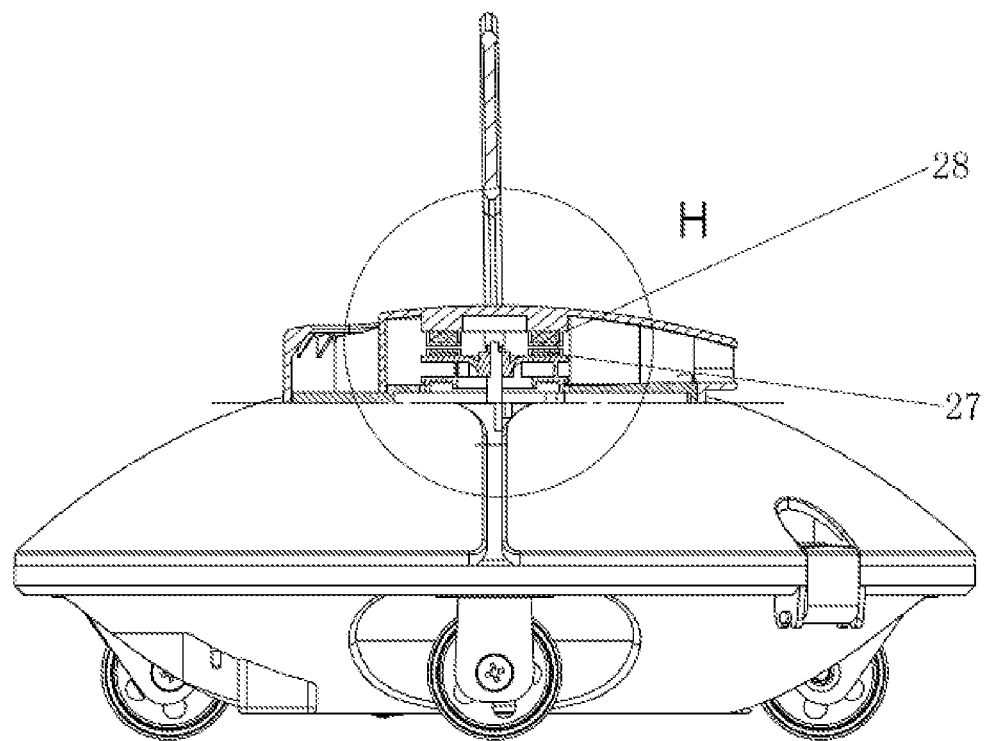
FIG. 21 is a sectional view along F-F direction of FIG. 19 according to example 3.
Figure 22:
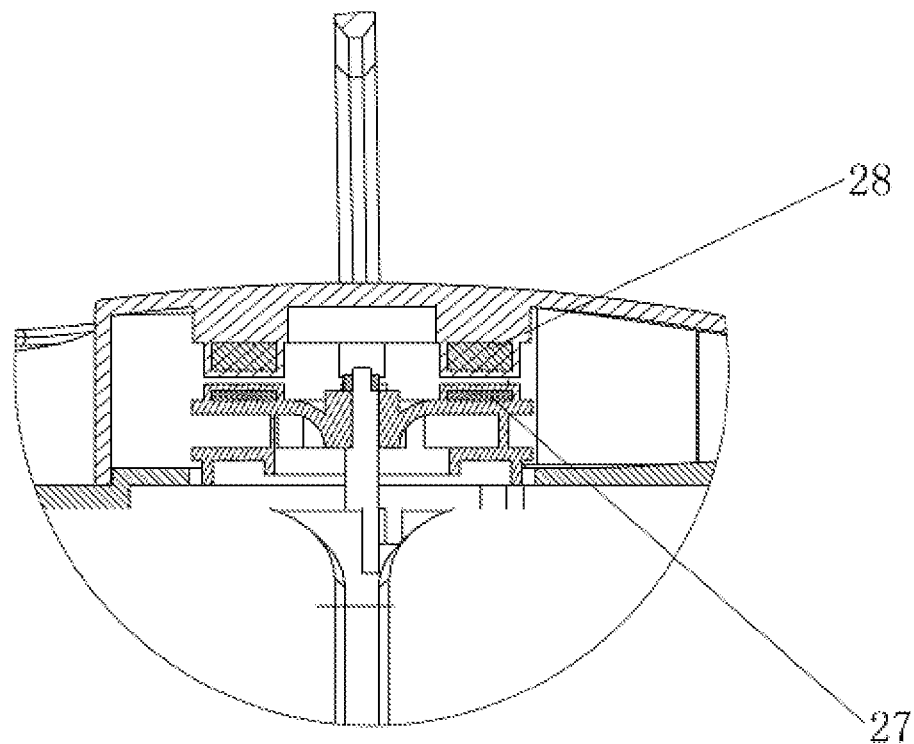
FIG. 22 is an enlarged view of region H.
Figure 23:
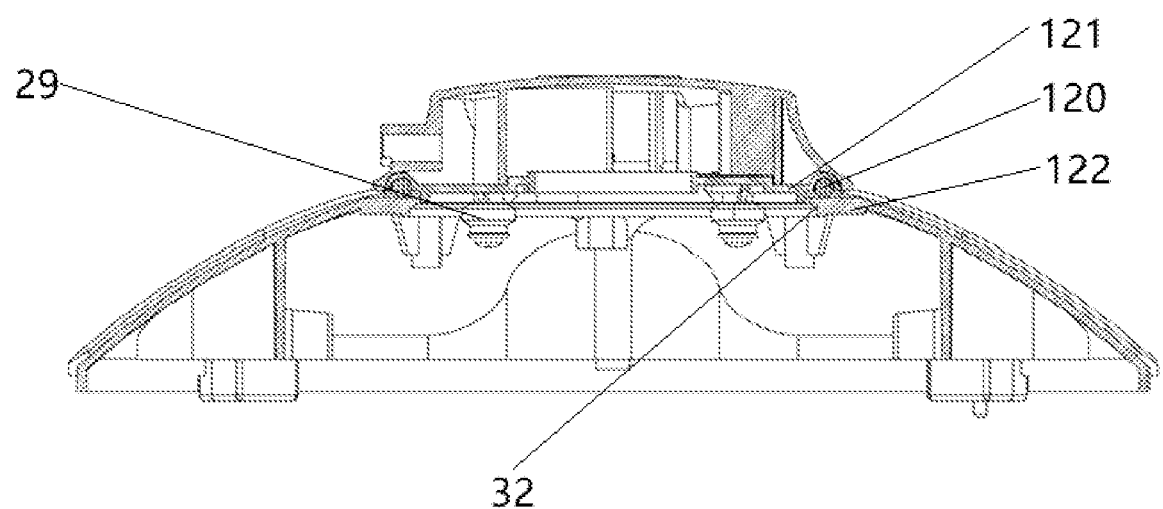
FIG. 23 is a schematic diagram of a further structure of a rotating section according to example 1 of the present invention.
Figure 24:
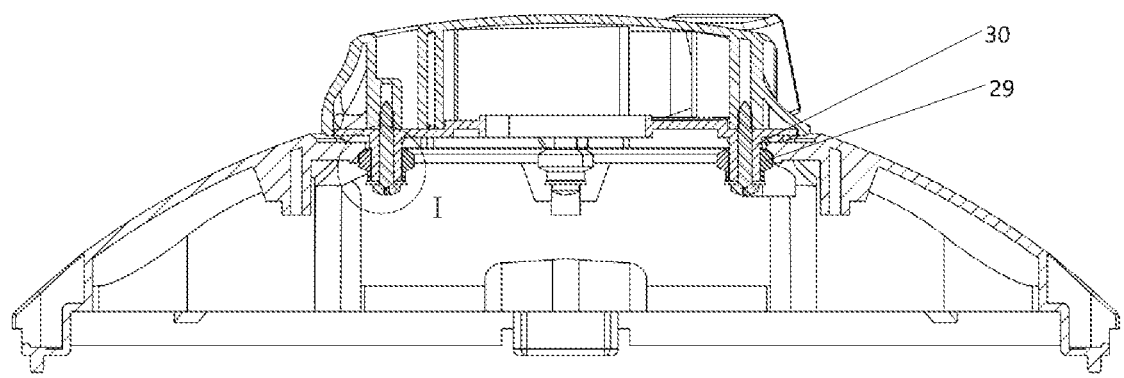
FIG. 24 is another schematic diagram of the further structure of the rotating section according to example 1 of the present invention.
Figure 25:
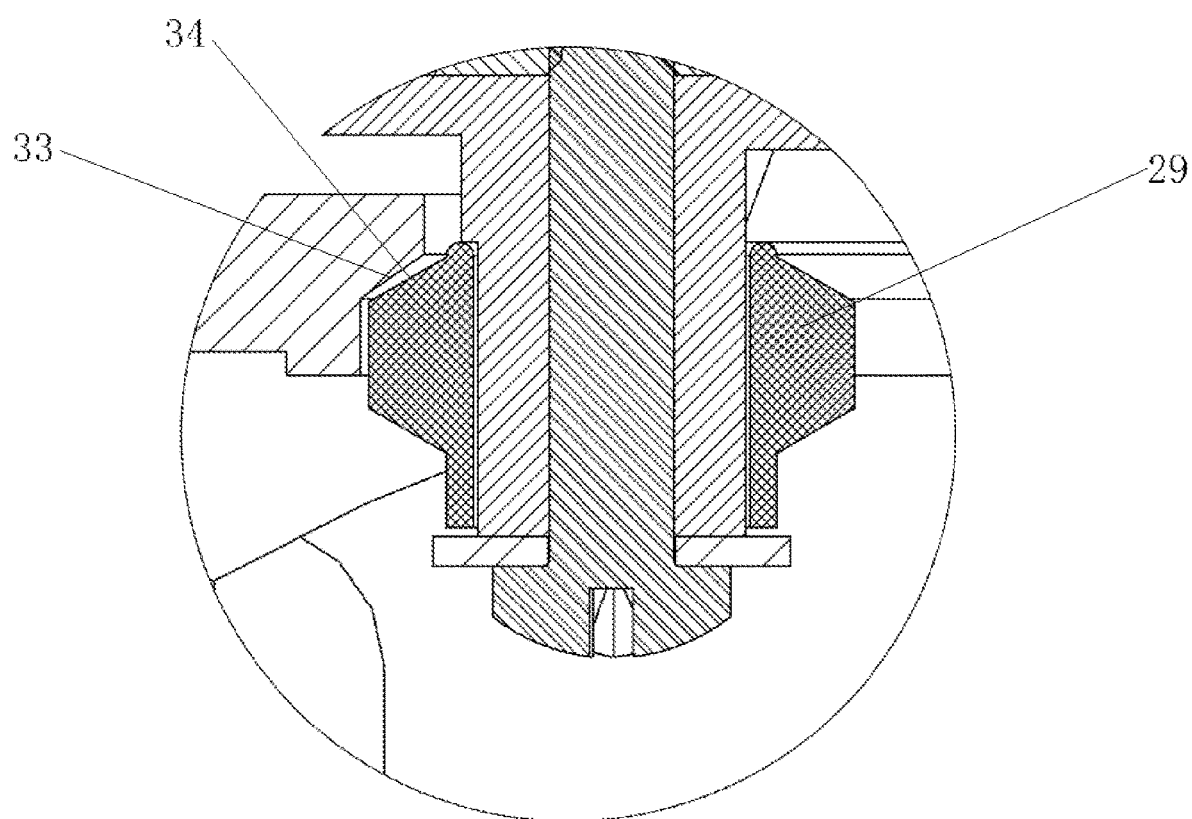
FIG. 25 is an enlarged view of region I of FIG. 24.
Figure 26:
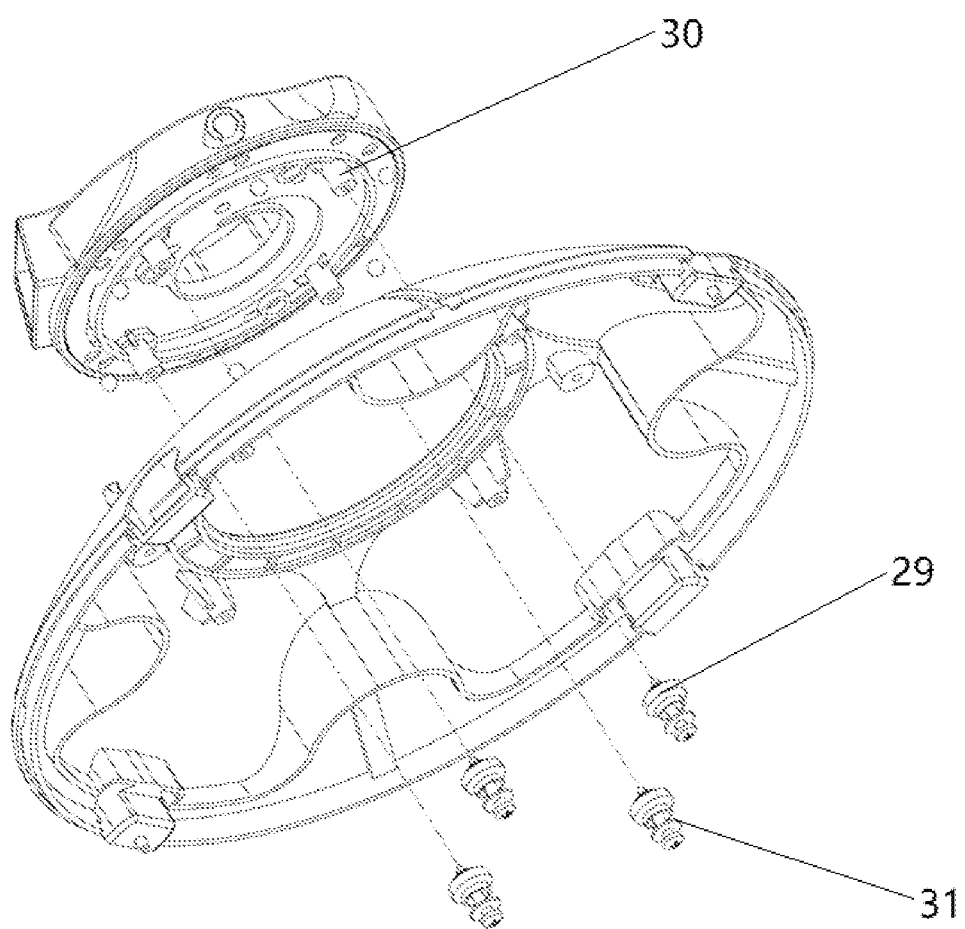
FIG. 26 is an exploded view of the further structure of the rotating section according to example 1 of the present invention.
Figure 27:
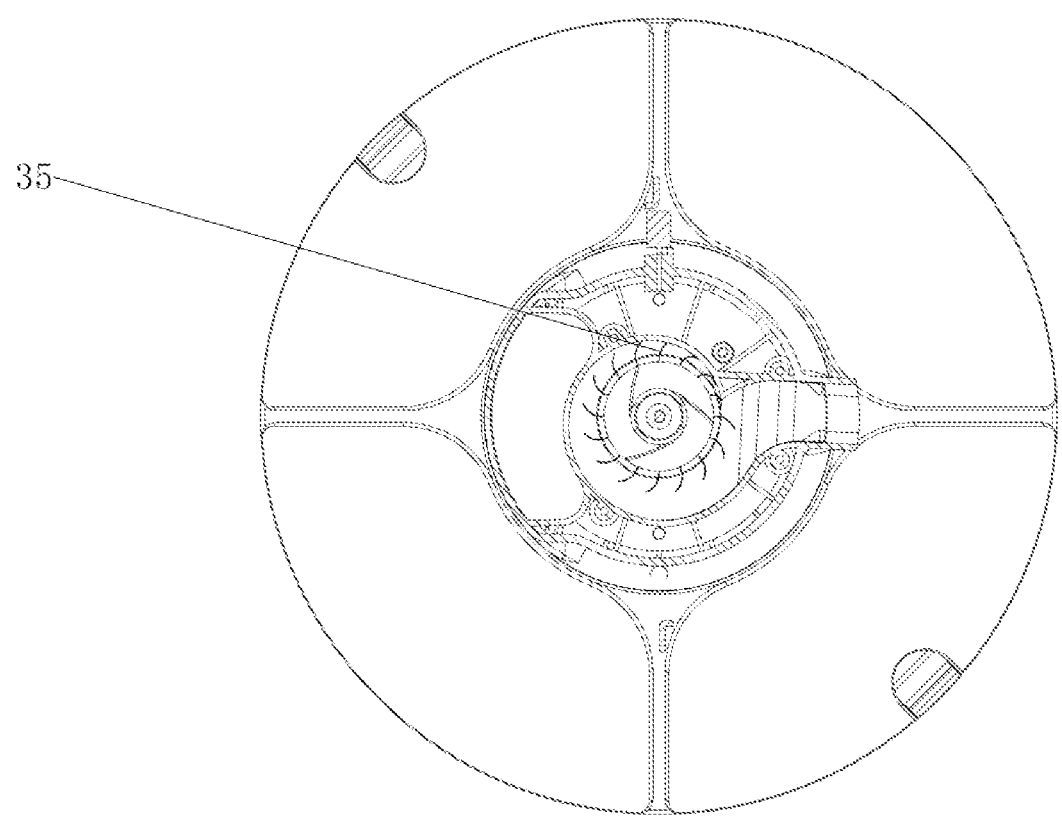
FIG. 27 is a schematic structure diagram of soft contact according to example 1 of the present invention.

This example differs from example 1 and example 2 in the following details. In this example, the torque of the suction assembly is transferred in a magnetic coupling manner, while in example 1 and example 2, the torque of the suction assembly is transferred in a hydraulic coupling manner, where the direction-changing assembly and the arresting assembly 10 are the same as those in example 1 and example 2 in structure, and the direction-changing assembly and the suction assembly are the same as those in example 1 and example 2 in structure. The differences are as follows: as shown in FIG. 19, FIG. 21 and FIG. 22, the mechanism for detecting obstacles and mechanically reversing (a direction of) a pool cleaner further includes a magnetic coupling assembly which is connected to the suction assembly 3 and the rotating assembly, respectively. With magnetic coupling between the coupling assemblies, the transfer of torque between the suction assembly 3 and the rotating assembly can be achieved, and rotations of the rotating assembly and the suction assembly 3 in the same direction can be achieved.

Specifically, as shown in FIGS. 19 and 21-22, the coupling assembly includes the first coupling piece 27 fixedly mounted on the suction assembly 3 and the second coupling piece 28 fixedly mounted on the inner casing structure 5 of the rotating assembly. Furthermore, the second coupling piece 28 is fixedly mounted on the top inner wall of the inner casing structure 5, while the first coupling piece 27 is fixedly mounted at the top of the suction assembly 3, and the position of the first coupling piece 27 corresponds to the position of the second coupling piece 28. Besides, the first coupling piece 27 and the second coupling piece 28 are arranged oppositely with a certain gap therebetween. The first coupling piece 27 and the second coupling piece 28 can be both magnets, or one of them can be a magnet. Specifically, when the first coupling piece 27 is a magnet, the second coupling piece 28 can be a magnet, or can be made of a ferromagnetic material such as iron, nickel and cobalt that can be attracted by the magnet. Similarly, when the second coupling piece 28 is a magnet, the first coupling piece 27 can be a magnet, or can be made of a ferromagnetic material such as iron, nickel and cobalt that can be attracted by the magnet. Here, preferably, the first coupling piece 27 and the second coupling piece 28 are permanent magnets, which are commercially available products and can be selected as required in practice. In this example, the first coupling piece 27 is fixedly connected to the suction assembly 3, and thus is allowed to rotate along with the rotation of the suction assembly 3. The second coupling piece 28 is fixedly connected to the top inner wall of the inner casing structure 5. During the rotation of the suction assembly 3, with the interaction of repelling or attraction between the permanent magnets, the transfer of torque between the suction assembly 3 and the rotating assembly can be achieved, and rotations of the rotating assembly and the suction assembly 3 in the same direction can be achieved. Moreover, the interaction force can be adjusted by regulating the magnetic field intensity of the magnets or a gap between the magnets within a certain range, so that different requirements of torque transfer and speed transfer can be met.

The fixed connection of the first coupling piece 27 and the suction assembly 3 is preferably achieved by encapsulating the first coupling piece 27 at the top of the suction assembly 3 by injection molding. The fixed connection of the second coupling piece 28 and the top inner wall of the inner casing structure 5 is preferably achieved by encapsulating the second coupling piece 28 on the top inner wall of the inner casing structure 5 by injection molding. Besides, the first coupling piece 27 and the second coupling piece 28 are preferably arranged face to face, so that the torque of the suction assembly 3 can be transferred by magnetic coupling.

At least one first coupling piece 27 and at least one second coupling piece 28 are provided. Preferably, the first coupling piece 27 and the second coupling piece 28 with equal quantity are used in pair. The number of the first coupling pieces 27 and the number of the second coupling pieces 28 can be selected as required in practice, which will not be specified here.

Other structures are the same as those in example 1 and example 2, which will not be described redundantly here.

In this example, the working process is as follows: the mechanism for obstacle detection and mechanical reverse of pool cleaner is mounted on the cleaner housing 1. The cleaner is placed in a swimming pool. When the cleaner is in static condition, the resistance plate 8 of the direction-changing assembly is upright. The cleaner is started, enabling the driving unit 13 to function to drive the suction assembly 3 to move, thereby drawing water into the filter inside the cleaner housing 1 for filtration. The filtered water flows into the rotating section and into the water channel 4 of the inner casing structure 5 through the water inlet of the suction assembly 3, and then is drained out of the water outlet 2 through the water channel 4. Moreover, when the suction assembly 3 rotates to drive the first coupling piece 27 to rotate; the magnetic field of the first coupling piece 27 interacts with the magnetic field of the second coupling piece 28 fixed on the rotating assembly to drive the rotating assembly to rotate, thereby allowing the rotating assembly to rotate driven by the turning section relative to the cleaner housing 1, and the filtered water is drained out of the water outlet 2 through the water channel 4. The resistance plate 8 is tilted in a direction opposite to the direction of rotation when the rotating assembly rotates; the arresting portion 11 of the direction-changing assembly comes in contact with the arresting assembly 10 to block the direction-changing assembly; the rotating section stops rotating; the resistance plate 8 is kept in the tilted state under the action of water resistance; and the cleaner travels under the action of thrust of water drained out of the water outlet 2 to clean the swimming pool. When the cleaner meets a wall, the force of the resistance caused by water acting on the resistance plate 8 disappears, causing the resistance plate 8 to return to the upright state; the arresting portion 11 of the direction-changing assembly is disengaged from the arresting assembly 10; the rotating section keeps on rotating; the arresting portion 11 of the direction-changing assembly passes over the arresting assembly 10 and keeps on rotating; and the water draining direction of the water outlet 2 is changed, resulting in a change in the traveling direction of the cleaner and thus achieving direction changing of the cleaner. When the rotating section rotates, the resistance plate 8 is tilted under the action of water resistance. When the direction-changing assembly rotates to next arresting assembly 10, the arresting portion 11 of the direction-changing assembly comes in contact with the arresting assembly 10; the rotating section stops rotating; and the cleaner travels under the acting force of the water drained out of the water outlet 2. When the cleaner meets a wall again, the above process is repeated until every position of the swimming pool is cleaned.

The present invention has the following advantages and beneficial effects: the use of the above technical scheme results in compact structure and low manufacturing cost of the mechanism for detecting obstacles and mechanically reversing (a direction of) a pool cleaner; obstacle detection and direction changing of the cleaner can be achieved; the rotary direction-changing assembly is capable of rotating relative to the cleaner housing, allowing the cleaner to travel in a different direction when meeting the wall with high working efficiency. The sealing device is fixedly connected to the cleaner housing. When an external power source is used to supply power, the driving unit mounted in the sealing device is electrically connected to the external power source by a power cable. The power cable does not rotate along with the rotary direction-changing assembly and thus may not be twisted and entangled with the cleaner, so that the cleaner supplied with electric energy through the power cable can change the direction without interference from the cable; in addition, the power cable is not twisted, resulting in high working efficiency and convenience of use of the cleaner. The rotating assembly and the direction-changing assembly are present, where the rotating assembly and the cleaner housing are capable of rotating relatively, thereby driving the direction-changing assembly to rotate. The direction-changing assembly cooperates with the arresting assembly to control the rotation of the rotating assembly, thereby controlling the traveling direction of the cleaner and allowing the cleaner to change directions. With the rotating assembly, convenient direction changing of the cleaner when meeting a wall can be realized. Moreover, simple structure, stable operation and convenient mounting of the cleaner are achieved. The rotating assembly is coupled with the suction assembly by a coupling piece. Based on the principle of magnetic coupling, the transfer of torque of the suction assembly can be achieved by the interaction of magnetic field between magnets or attraction between a magnet and a ferromagnetic material, allowing the rotating assembly and the suction assembly to rotate in the same direction and thus achieving traveling and direction changing of the cleaner; and simple structure, stable operation and convenient mounting of the cleaner are achieved. The rotating assembly is hydraulically coupled with the suction assembly. The change in moment of momentum due to the interaction of water, the rotating assembly and the suction assembly results in the transfer of torque of the suction assembly, allowing the rotating assembly and the suction assembly to rotate coaxially and thus achieving traveling and direction changing of the cleaner; and simple structure, stable operation and convenient mounting of the cleaner are achieved.

The foregoing are detailed descriptions of three examples of the present invention, which are merely preferred examples of the present invention and cannot be construed as limiting the scope of implementation of the present invention. Any equivalent modifications, improvements, etc. made within the application scope of the present invention should fall within the protection scope of the present invention.

What is claimed is:

1. A mechanism for detecting obstacles and mechanically reversing a direction of a pool cleaner, comprising:
   a drive part in a non-rotatable connection with a cleaner housing,
   an arresting assembly, and
   a rotary direction-changing assembly, wherein
   the rotary direction-changing assembly is rotatably connected to the cleaner housing or the drive part, and the rotary direction-changing assembly rotates under an action of the drive part to change a direction of the pool cleaner, and the arresting assembly is connected to the cleaner housing, and the arresting assembly cooperates with the rotary direction-changing assembly to stop or move the rotary direction-changing assembly.

2. The mechanism according to claim 1, wherein the drive part comprises a driving unit and a suction assembly, the driving unit and the suction assembly are connected, the driving unit is in the non-rotatable connection with the cleaner housing, and the rotary direction-changing assembly is coupled with the suction assembly or the rotary direction-changing assembly is in contact with the suction assembly.

3. The mechanism according to claim 2, wherein the rotary direction-changing assembly comprises a rotating assembly and a direction-changing assembly, the rotating assembly is rotatably connected to the cleaner housing or the drive part, and the direction-changing assembly is connected to the rotating assembly.

4. The mechanism according to claim 3, wherein the rotating assembly comprises a rotating section and a turning section, the rotating section is connected to the turning section, and the turning section is rotatably connected to the cleaner housing or the drive part.

5. The mechanism according to claim 4, wherein the rotating section is provided with a water channel and a water outlet, the water channel and the water outlet are in a fluid communication with each other, and the suction assembly cooperates with the water channel.

6. The mechanism according to claim 5, further comprising an inner casing structure and an outer casing structure, the inner casing structure comprises the water channel and the water outlet, and the outer casing structure is arranged outside the inner casing structure, wherein a resistance piece is arranged on an inner wall of the outer casing structure or on an outer wall of the inner casing structure.

7. The mechanism according to claim 6, wherein a bottom plate is arranged at an open end of the inner casing structure, and a through hole is formed in the bottom plate so that filtered water flows into the water channel via a water inlet of the suction assembly.

8. The mechanism according to claim 7, wherein the turning section comprises at least one group of rolling pieces, a rolling supporting piece and a supporting piece, the rolling supporting piece is fixedly connected to the outer casing structure or the bottom plate, the supporting piece is fixedly connected to the cleaner housing, and each of the rolling pieces of the at least one group of rolling pieces is in a rolling connection with the cleaner housing, the rolling supporting piece and the supporting piece, respectively.

9. The mechanism according to claim 7, wherein the turning section comprises an upper rotating plate and a lower rotating plate, the upper rotating plate is fixedly connected to the outer casing structure, the lower rotating plate is fixedly connected to the bottom plate, and an upper open end of the cleaner housing is arranged between the upper rotating plate and the lower rotating plate, and the upper open end of the cleaner housing is in a clearance fit with the upper rotating plate and the lower rotating plate so that the rotating assembly rotates relative to the cleaner housing.

10. The mechanism according to claim 7, wherein the turning section comprises a rolling supporting piece, a supporting piece, a roller, a stop piece, and at least one group of rolling pieces, wherein
the rolling supporting piece is fixedly connected to the bottom plate, the supporting piece is fixedly connected to the cleaner housing, each of the rolling pieces of the at least one group of rolling pieces is in a rolling connection with the rolling supporting piece and the supporting piece, respectively;
the roller is arranged on a column on the bottom plate and rotates relative to the column, the roller is in a running fit with a track of the supporting piece to limit the rotating assembly in an axial direction and a radial direction; and
the stop piece is arranged at an end of the column to block the roller.

11. The mechanism according to claim 3, wherein the suction assembly is hydraulically coupled with the rotating assembly.

12. The mechanism according to claim 3, wherein the suction assembly is magnetically coupled with the rotating assembly.

13. The mechanism according to claim 12, wherein the suction assembly is magnetically coupled with the rotating assembly by a magnetic coupling assembly, the magnetic coupling assembly is connected to the suction assembly and the rotating assembly, respectively, and the rotating assembly and the suction assembly are allowed to rotate in a same direction by a magnetic coupling.

14. The mechanism according to claim 13, wherein the magnetic coupling assembly comprises a first coupling piece and a second coupling piece, the first coupling piece is arranged on the suction assembly, and the second coupling piece is arranged on the rotating assembly, the first coupling piece and the second coupling piece are arranged oppositely, and a predetermined gap is provided between the first coupling piece and the second coupling piece.

15. The mechanism according to claim 3, wherein the direction-changing assembly is provided with at least one resistance plate.

16. The mechanism according to claim 3, wherein a kinetic energy transfer structure or a kinetic energy transfer assembly is arranged on the suction assembly and/or the rotating assembly.

17. The mechanism according to claim 3, wherein the contact between the rotary direction-changing assembly and the suction assembly is achieved by arranging a component between the suction assembly and the rotating assembly.

18. The mechanism according to claim 3, wherein a rotating piece is arranged on the direction-changing assembly, a first end of the rotating piece is rotatably connected to the rotating assembly and an arresting portion is arranged at a second end of the rotating piece, the arresting portion cooperates with the arresting assembly in a manner of blocking or disengagement to arrest and move the rotating assembly, when the arresting portion is blocked by the arresting assembly, the rotating assembly is arrested, and when the arresting portion is disengaged from the arresting assembly, the rotating assembly moves.

19. The mechanism according to claim 1, wherein the drive part is fixedly connected to the cleaner housing.

20. The mechanism according to claim 1, wherein the arresting assembly cooperates with the rotary direction-changing assembly in a manner of blocking or disengagement; wherein the rotary direction-changing assembly is arrested when blocked by the arresting assembly, and the rotary direction-changing assembly moves when being disengaged from the arresting assembly.

* * * * *